(12) United States Patent
Sato

(10) Patent No.: US 8,903,187 B2
(45) Date of Patent: Dec. 2, 2014

(54) IMAGE PROCESSING DEVICE AND IMAGE PROCESSING METHOD

(71) Applicant: Sony Corporation, Tokyo (JP)

(72) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/077,932

(22) Filed: Nov. 12, 2013

(65) Prior Publication Data

US 2014/0064362 A1 Mar. 6, 2014

Related U.S. Application Data

(63) Continuation of application No. 13/881,927, filed as application No. PCT/JP2011/073657 on Oct. 14, 2011.

(30) Foreign Application Priority Data

Dec. 9, 2010 (JP) ................................. 2010-275116
Mar. 8, 2011 (JP) ................................. 2011-049992

(51) Int. Cl.
G06K 9/36 (2006.01)
H04N 19/124 (2014.01)
H04N 19/126 (2014.01)
H04N 19/122 (2014.01)
G06T 9/00 (2006.01)
H04N 19/60 (2014.01)

(52) U.S. Cl.
CPC ..... *H04N 19/00084* (2013.01); *H04N 19/0009* (2013.01); *H04N 19/00096* (2013.01); *G06T 9/007* (2013.01); *H04N 7/30* (2013.01)
USPC .......................................................... 382/232

(58) Field of Classification Search
USPC .................................................. 382/232–253
See application file for complete search history.

(56) References Cited

U.S. PATENT DOCUMENTS 5,107,345 A * 4/1992 Lee ................................ 382/250
8,406,533 B2 * 3/2013 Fukuhara et al. ............. 382/218
(Continued)

FOREIGN PATENT DOCUMENTS

JP 6-284412 10/1994
JP 2004-254327 9/2004
(Continued)

OTHER PUBLICATIONS

U.S. Appl. No. 14/082,988, filed Nov. 18, 2013, Sato.
(Continued)

*Primary Examiner* — Alex Liew
(74) *Attorney, Agent, or Firm* — Oblon, Spivak, McClelland, Maier & Neustadt, L.L.P.

(57) ABSTRACT

Provided is an image processing device including a selection section configured to select, from a plurality of transform units with different sizes, a transform unit used for inverse orthogonal transformation of image data to be decoded, a generation section configured to generate, from a first quantization matrix corresponding to a transform unit for a first size, a second quantization matrix corresponding to a transform unit for a second size from a first quantization matrix corresponding to a transform unit for a first size, and an inverse quantization section configured to inversely quantize transform coefficient data for the image data using the second quantization matrix generated by the generation section when the selection section selects the transform unit for the second size.

14 Claims, 25 Drawing Sheets

(56) References Cited

U.S. PATENT DOCUMENTS

| | | | |
|---|---|---|---|
| 2005/0094881 A1* | 5/2005 | Takagi | 382/232 |
| 2007/0286501 A1 | 12/2007 | Sato et al. | |
| 2010/0202705 A1* | 8/2010 | Fukuhara et al. | 382/218 |
| 2011/0026611 A1 | 2/2011 | Kenji | |
| 2012/0121188 A1 | 5/2012 | Kenji | |
| 2013/0028531 A1 | 1/2013 | Sato | |
| 2013/0051477 A1 | 2/2013 | Sasaki | |
| 2013/0071039 A1 | 3/2013 | Sato | |
| 2013/0108185 A1* | 5/2013 | Kenji | 382/250 |
| 2013/0216149 A1 | 8/2013 | Sato | |
| 2013/0251032 A1 | 9/2013 | Tanaka | |
| 2013/0251050 A1 | 9/2013 | Ikeda et al. | |
| 2013/0259142 A1 | 10/2013 | Ikeda et al. | |
| 2013/0301739 A1 | 11/2013 | Sato | |
| 2013/0301743 A1 | 11/2013 | Ikeda et al. | |
| 2013/0301942 A1 | 11/2013 | Kondo | |
| 2013/0322525 A1 | 12/2013 | Tanaka | |
| 2013/0330012 A1 | 12/2013 | Sato | |
| 2013/0343451 A1 | 12/2013 | Sato | |
| 2014/0003510 A1 | 1/2014 | Lu et al. | |
| 2014/0023150 A1 | 1/2014 | Kondo | |
| 2014/0086322 A1 | 3/2014 | Takahashi et al. | |
| 2014/0092958 A1 | 4/2014 | Sato | |
| 2014/0105281 A1 | 4/2014 | Sato et al. | |

FOREIGN PATENT DOCUMENTS

| | | |
|---|---|---|
| WO | WO 2007/094100 A1 | 8/2007 |
| WO | WO 2008/132890 A1 | 11/2008 |

OTHER PUBLICATIONS

U.S. Appl. No. 14/123,375, filed Dec. 2, 2013, Ikeda.

"Test Model under Consideration" Joint Collaborative Team on Video Coding (JCT-VC) of ITU-T SG16 WP3 and ISO/IEC JTC1/SC29/WG11, $2^{nd}$ Meeting, Jul. 21-28, 2010, 153 pages.

Akiyuki Tanizawa, et al., "Adaptive Quantization Matrix Selection on KTA Software", VCEG-AD06, ITU—Telecommunications Standardization Sector, Study Group 16 Question 6, Video Coding Experts Group, 30th Meeting, Oct. 23-24, 2006, 5 pages.

* cited by examiner

FIG. 4

| QUANTIZATION MATRIX (TU) SIZE | MATRIX TYPE FLAG | DIFFERENCE FLAG | MATRIX INFORMATION TO BE ENCODED |
|---|---|---|---|
| 4 X 4 | 1 : USER-DEFINED | | 4x4 MATRIX INFORMATION (BASE MATRIX INFORMATION) |
| | 0 : DEFAULT | | — |
| 8 X 8 | 1 : USER-DEFINED | 1: AVAILABLE | DIFFERENCE MATRIX INFORMATION ABOUT PREDICTED MATRIX FROM 4x4 MATRIX |
| | | 0: UNAVAILABLE | — |
| | 0 : DEFAULT | | — |
| 16 X 16 | 1 : USER-DEFINED | 1: AVAILABLE | DIFFERENCE MATRIX INFORMATION ABOUT PREDICTED MATRIX FROM 8x8 MATRIX |
| | | 0: UNAVAILABLE | — |
| | 0 : DEFAULT | | — |
| 32 X 32 | 1 : USER-DEFINED | 1: AVAILABLE | DIFFERENCE MATRIX INFORMATION ABOUT PREDICTED MATRIX FROM 16x16 MATRIX |
| | | 0: UNAVAILABLE | — |
| | 0 : DEFAULT | | — |

EXAMPLE PARAMETERS IN SPS

FIG. 5

| QUANTIZATION MATRIX (TU) SIZE | UPDATE FLAG | MATRIX TYPE FLAG | DIFFERENCE FLAG | MATRIX INFORMATION TO BE ENCODED |
|---|---|---|---|---|
| 4 X 4 | 1: AVAILABLE | 1: USER-DEFINED | | 4x4 MATRIX INFORMATION (BASE MATRIX INFORMATION) |
| | | 0: DEFAULT | — | — |
| | 0: UNAVAILABLE | — | — | — |
| 8 X 8 | 1: AVAILABLE | 1: USER-DEFINED | 1: AVAILABLE | DIFFERENCE MATRIX INFORMATION ABOUT PREDICTED MATRIX FROM 4x4 MATRIX |
| | | | 0: UNAVAILABLE | — |
| | | 0: DEFAULT | — | — |
| | 0: UNAVAILABLE | — | — | — |
| 16 X 16 | 1: AVAILABLE | 1: USER-DEFINED | 1: AVAILABLE | DIFFERENCE MATRIX INFORMATION ABOUT PREDICTED MATRIX FROM 8x8 MATRIX |
| | | | 0: UNAVAILABLE | — |
| | | 0: DEFAULT | — | — |
| | 0: UNAVAILABLE | — | — | — |
| 32 X 32 | 1: AVAILABLE | 1: USER-DEFINED | 1: AVAILABLE | DIFFERENCE MATRIX INFORMATION ABOUT PREDICTED MATRIX FROM 16x16 MATRIX |
| | | | 0: UNAVAILABLE | — |
| | | 0: DEFAULT | — | — |
| | 0: UNAVAILABLE | — | — | — |

EXAMPLE PARAMETERS IN PPS

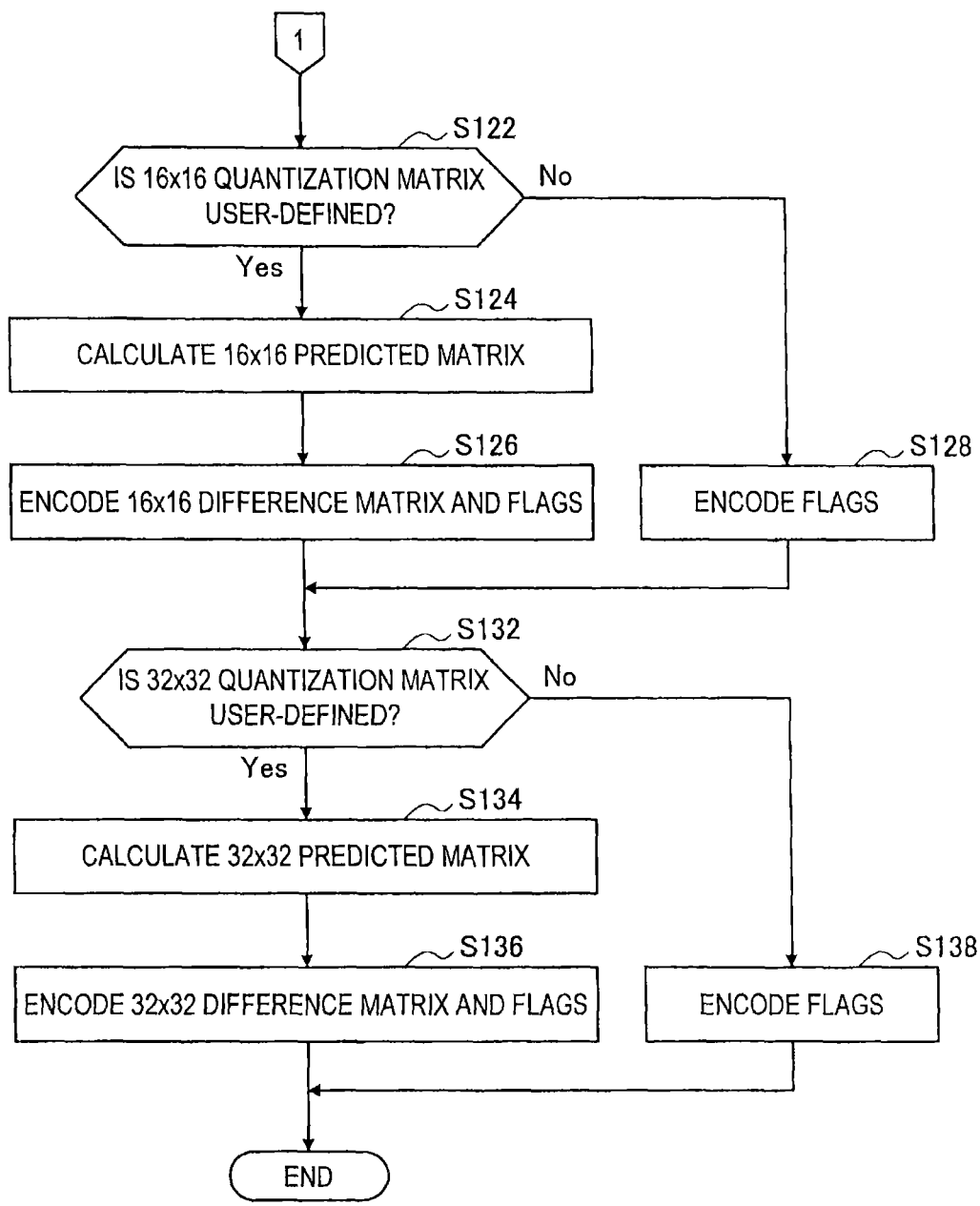

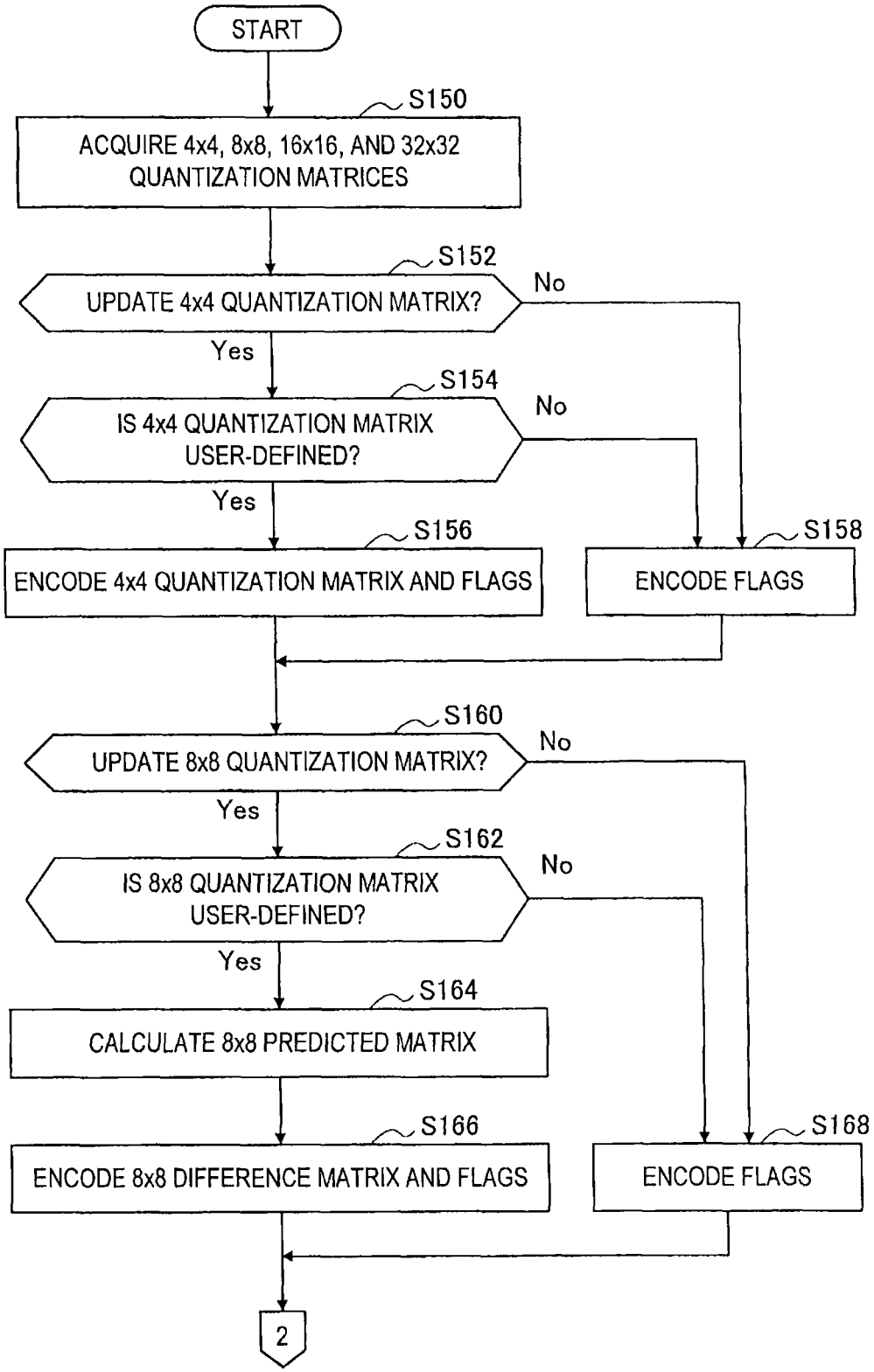

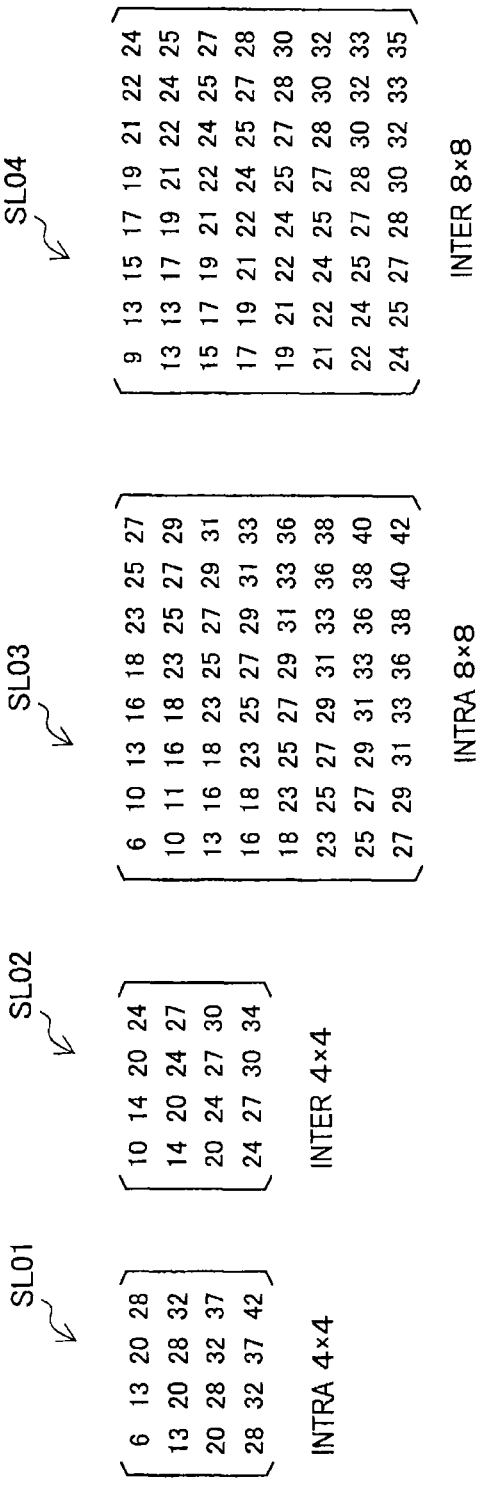

IMAGE PROCESSING DEVICE AND IMAGE PROCESSING METHOD

CROSS-REFERENCE TO RELATED APPLICATIONS

This application is a continuation of U.S. Ser. No. 13/881,927 filed Apr. 26, 2013, the entire content of which is incorporated herein by reference, which is the national stage of PCT/JP11/073,657 filed Oct. 14, 2011, and claims the benefit of priority under 35 U.S.C. 119 to Japanese Application Nos. 2010-275116 filed Dec. 9, 2010 and 2011-049992 filed Mar. 8, 2011.

TECHNICAL FIELD

The present disclosure relates to an image processing device and an image processing method.

BACKGROUND ART

H.264/AVC, one of standard specifications for image encoding schemes, can use different quantization steps for orthogonal transform coefficient components to quantize image data in a profile equal to High Profile or higher. A quantization step for each orthogonal transform coefficient component can be configured based on a quantization matrix (also referred to as a scaling list) and a reference step value. The quantization matrix is defined as a size substantially the same as an orthogonal transform unit.

FIG. 19 illustrates preset values (default values) for four types of quantization matrices predefined in H.264/AVC. For example, matrix SL01 is a default for the quantization matrix if the transform unit size is 4×4 in intra prediction mode. Matrix SL02 is a default for the quantization matrix if the transform unit size is 4×4 in inter prediction mode. Matrix SL03 is a default for the quantization matrix if the transform unit size is 8×8 in intra prediction mode. Matrix SL04 is a default for the quantization matrix if the transform unit size is 8×8 in inter prediction mode. A user can use a sequence parameter set or a picture parameter set to specify a specific quantization matrix different from the default values shown in FIG. 19. If the quantization matrix is not used, an equal value is used for all components of the quantization step used for the quantization.

High Efficiency Video Coding (HEVC) is a next-generation image encoding scheme as a successor to H.264/AVC and its standardization is promoted. HEVC incorporates the concept of coding unit (CU) which corresponds to a conventional macro block (see Non-Patent Literature 1 below). The sequence parameter set specifies a range of coding unit sizes using a set of power-of-two values which are a largest coding unit (LCU) and a smallest coding unit (SCU). The use of split_flag specifies a specific coding unit size within the range specified by LCU and SCU.

According to HEVC, one coding unit can be divided into one or more orthogonal transformation units, namely one or more transform units (TUs). The transform unit size can be set to any of 4×4, 8×8, 16×16, and 32×32. Accordingly, a quantization matrix can be specified according to each of these transform unit size candidates.

H.264/AVC allows for designating only one quantization matrix for one transform unit size within one picture as specified in the released reference software (http://iphome.hhi.de/suchring/tml/index.htm) referred to as a joint model (JM). By contrast, Non-Patent Literature 2 shown below proposes to designate multiple quantization matrix candidates for one transform unit size within one picture and adaptively select a quantization matrix for each block from the viewpoint of rate-distortion (RD) optimization.

CITATION LIST

Non-Patent Literature

Non-Patent Literature 1: JCTVC-B205, "Test Model under Consideration", Joint Collaborative Team on Video Coding (JCT-VC) of ITU-T SG16 WP3 and ISO/IEC JTC1/SC29/WG11 2nd Meeting: Geneva, CH, 21-28 Jul., 2010

Non-Patent Literature 2: VCEG-AD06, "Adaptive Quantization Matrix Selection on KTA Software", ITU—Telecommunications Standardization Sector STUDY GROUP 16 Question 6 Video Coding Experts Group (VCEG) 30th Meeting: Hangzhou, China, 23-24 Oct., 2006

SUMMARY OF INVENTION

Technical Problem

However, increasing selectable transform unit size types also increases the number of available quantization matrices. Increasing amount of codes of quantization matrices may degrade coding efficiency. The coding efficiency may degrade more remarkably if the number of quantization matrices which can be designated for each transform unit size changes from one to more.

The technology according to the present disclosure aims at providing an image processing device and an image processing method capable of suppressing an increase in amount of codes due to an increase in the number of quantization matrices.

Solution to Problem

According to an embodiment of the present disclosure, there is provided an image processing device including a selection section configured to select, from a plurality of transform units with different sizes, a transform unit used for inverse orthogonal transformation of image data to be decoded, a generation section configured to generate, from a first quantization matrix corresponding to a transform unit for a first size, a second quantization matrix corresponding to a transform unit for a second size, and an inverse quantization section configured to inversely quantize transform coefficient data for the image data using the second quantization matrix generated by the generation section when the selection section selects the transform unit for the second size.

The image processing device can be realized typically as an image decoding device for decoding an image.

Further, the generation section may generate the second quantization matrix using matrix information specifying the first quantization matrix and difference information representing a difference between a predicted matrix having the second size predicted from the first quantization matrix and the second quantization matrix.

Further, the generation section may acquire the matrix information and the difference information from a sequence parameter set or a picture parameter set.

Further, the generation section may set the predicted matrix to be the second quantization matrix when one of a sequence parameter set and a picture parameter set provides a first flag indicating absence of a difference between the predicted matrix and the second quantization matrix.

Further, the first size may represent a minimum one of sizes for the transform units.

Further, the second size may be larger than the first size. The generation section may calculate the predicted matrix by duplicating one of a first element and a second element as an element between the first element and the second element adjacent to each other in the first quantization matrix.

Further, the second size may be larger than the first size. The generation section may calculate the predicted matrix by linearly interpolating an element between a first element and a second element adjacent to each other in the first quantization matrix.

Further, the second size may be double of the first size on one side.

Further, the second size may be smaller than the first size. The generation section may calculate the predicted matrix by thinning an element of the first quantization matrix.

Further, the second size may be smaller than the first size. The generation section may calculate the predicted matrix by averaging a plurality of elements adjacent to each other in the first quantization matrix.

Further, the generation section may generate the second quantization matrix from the first quantization matrix when one of a sequence parameter set and a picture parameter set provides a second flag to specify use of a user-defined matrix as the second quantization matrix.

Further, according to another embodiment of the present disclosure, there is provided an image processing method including selecting, from a plurality of transform units with different sizes, a transform unit used for inverse orthogonal transformation of image data to be decoded, generating, from a first quantization matrix corresponding to a transform unit for a first size, a second quantization matrix corresponding to a transform unit for a second size, and inversely quantizing transform coefficient data for the image data using the second quantization matrix generated from the first quantization matrix when a transform unit for the second size is selected.

Further, according to another embodiment of the present disclosure, there is provided an image processing device including a selection section configured to select, from a plurality of transform units with different sizes, a transform unit used for orthogonal transformation of image data to be encoded, a quantization section configured to quantize transform coefficient data generated by orthogonally transforming the image data based on a transform unit selected by the selection section, by using a quantization matrix corresponding to the selected transform unit, and an encoding section configured to encode information for generating a second quantization matrix corresponding to a transform unit for a second size from a first quantization matrix corresponding to a transform unit for a first size.

The image processing device can be realized typically as an image encoding device for encoding an image.

Further, according to another embodiment of the present disclosure, there is provided an image processing method including selecting, from a plurality of transform units with different sizes, a transform unit used for orthogonal transformation of image data to be encoded, quantizing transform coefficient data generated by orthogonally transforming the image data based on a selected transform unit, by using a quantization matrix corresponding to the selected transform unit, and encoding information for generating a second quantization matrix corresponding to a transform unit for a second size from a first quantization matrix corresponding to a transform unit for a first size.

Advantageous Effects of Invention

As described above, the image processing device and the image processing method according to the present disclosure can suppress in an increase in the code amount due to an increase in the number of quantization matrices.

BRIEF DESCRIPTION OF DRAWINGS

FIG. 4 is an explanatory diagram illustrating information inserted into a sequence parameter set according to an embodiment.

FIG. 5 is an explanatory diagram illustrating information inserted into a picture parameter set according to an embodiment.

FIG. 6B is the latter half of a flowchart illustrating the first example of encoding process flow according to an embodiment.

FIG. 7A is the first half of a flowchart illustrating a second example of encoding process flow according to an embodiment.

FIG. 19 is an explanatory diagram illustrating quantization matrix default values predefined in H.264/AVC.

DESCRIPTION OF EMBODIMENT

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the detailed description of the embodiment(s) is described in a following order.

<1. Configuration examples of the image encoding device according to an Embodiment>
1-1. Overall configuration example
1-2. Configuration example of the orthogonal transformation and quantization section
1-3. Detailed configuration example of the matrix processing section
1-4. Examples of information to be encoded
2. Encoding process flow according to an embodiment
3. Configuration examples of the image decoding device according to an embodiment
3-1. Overall configuration example
3-2. Configuration example of the inverse quantization and inverse orthogonal transformation section
3-3. Detailed configuration example of the matrix generation section
4. Decoding process flow according to an embodiment
5. Modifications
6. Example Applications
7. Summing-up
1. Configuration examples of the image encoding device according to an Embodiment The following describes configuration examples of the image encoding device according to an embodiment.

[1-1. Image Encoding Device]

Figure 1:
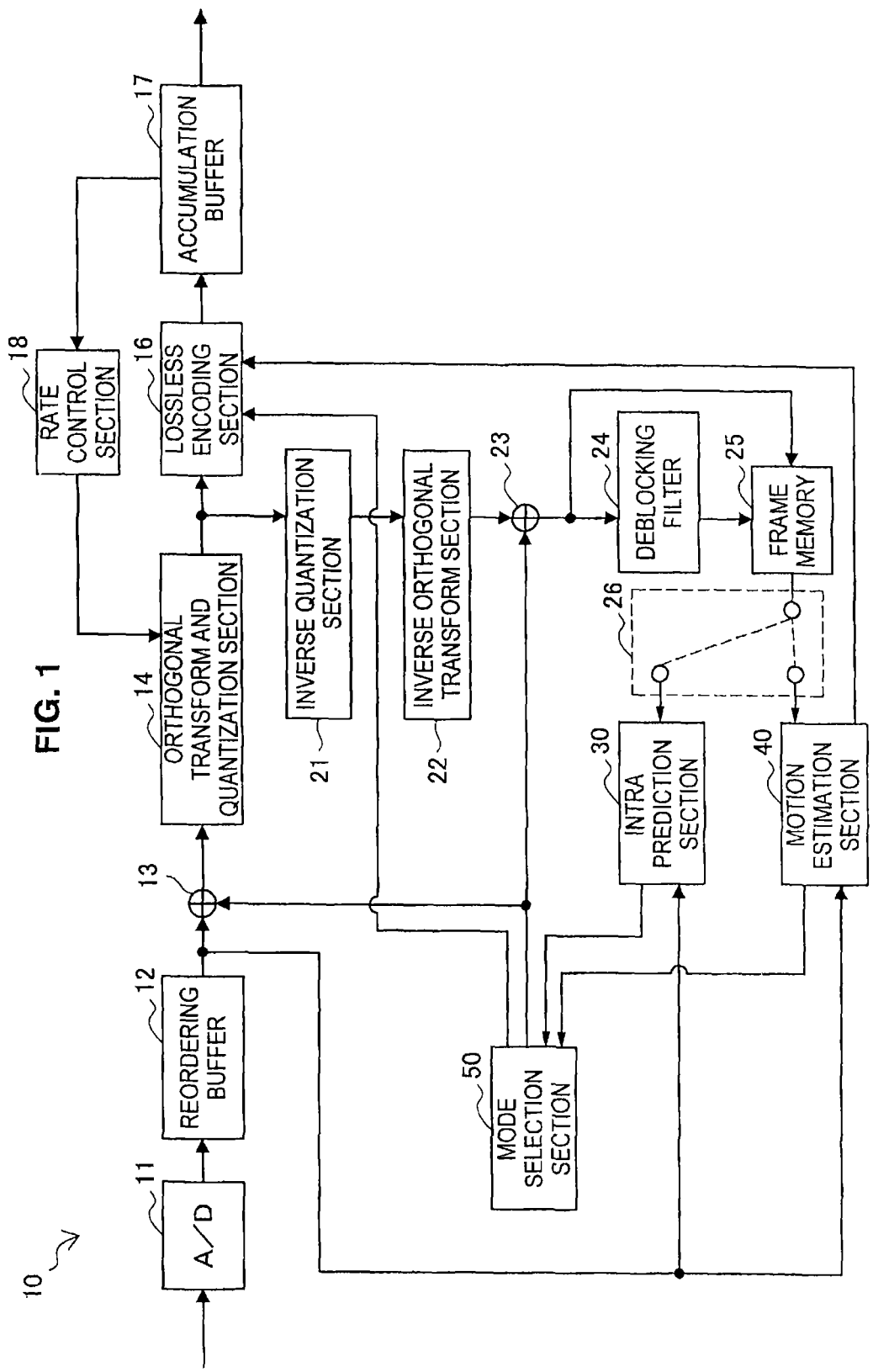
FIG. 1 is a block diagram illustrating a hardware configuration of an image encoding device according to an embodiment.

FIG. 1 is a block diagram showing an example of a configuration of an image encoding device 10 according to an embodiment. Referring to FIG. 1, the image encoding device 10 includes an A/D (Analogue to Digital) conversion section 11, a reordering buffer 12, a subtraction section 13, an orthogonal transformation and quantization section 14, a lossless encoding section 16, an accumulation buffer 17, a rate control section 18, an inverse quantization section 21, an inverse orthogonal transform section 22, an addition section 23, a deblocking filter 24, a frame memory 25, a selector 26, an intra prediction section 30, a motion estimation section 40, and a mode selection section 50.

The A/D conversion section 11 converts an image signal input in an analogue format into image data in a digital format, and outputs a series of digital image data to the reordering buffer 12.

The reordering buffer 12 sorts the images included in the series of image data input from the A/D conversion section 11. After reordering the images according to the a GOP (Group of Pictures) structure according to the encoding process, the reordering buffer 12 outputs the image data which has been sorted to the subtraction section 13, the intra prediction section 30, and the motion estimation section 40.

The image data input from the reordering buffer 12 and predicted image data selected by the mode selection section 50 described later are supplied to the subtraction section 13.

The subtraction section 13 calculates predicted error data which is a difference between the image data input from the reordering buffer 12 and the predicted image data input from the mode selection section 50, and outputs the calculated predicted error data to the orthogonal transformation and quantization section 14.

The orthogonal transformation and quantization section 14 performs orthogonal transformation and quantization on prediction error data supplied from the subtraction section 13 and outputs quantized transform coefficient data (hereinafter referred to as quantized data) to a lossless encoding section 16 and an inverse quantization section 21. A bit rate of quantized data output from the orthogonal transformation and quantization section 14 is controlled based on a rate control signal from a rate control section 18. A detailed configuration of the orthogonal transformation and quantization section 14 will be described later.

The lossless encoding section 16 is supplied with quantized data input from the orthogonal transformation and quantization section 14, information for generating a quantization matrix at the decoding side, and information about intra prediction or inter prediction selected by a mode selection section 50. The information about the intra prediction may contain prediction mode information indicating appropriate intra prediction mode for each block. The information about inter prediction may contain prediction mode information for prediction of a motion vector for each block, a difference motion vector, and reference image information, for example.

The lossless encoding section 16 performs lossless encoding on quantized data to generate an encoded stream. The lossless encoding section 16 may provide variable-length encoding or arithmetic encoding as lossless encoding. The lossless encoding section 16 multiplexes information for generating a quantization matrix (to be described later) in a header (e.g., a sequence parameter set and a picture parameter set) of an encoded stream. Furthermore, the lossless encoding section 16 multiplexes information about the intra prediction or the inter prediction in the encoded stream header. The lossless encoding section 16 outputs a generated encoded stream to the storage buffer 17.

The accumulation buffer 17 temporarily stores the encoded stream input from the lossless encoding section 16 using a storage medium, such as a semiconductor memory. Then, the accumulation buffer 17 outputs the accumulated encoded stream at a rate according to the band of a transmission line (or an output line from the image encoding device 10).

The rate control section 18 monitors the free space of the accumulation buffer 17. Then, the rate control section 18 generates a rate control signal according to the free space on the accumulation buffer 17, and outputs the generated rate control signal to the orthogonal transformation and quantization section 14. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21 performs an inverse quantization process on the quantized data input from the orthogonal transformation and quantization section 14. Then, the inverse quantization section 21 outputs transform coefficient data acquired by the inverse quantization process to the inverse orthogonal transform section 22.

The inverse orthogonal transform section 22 performs an inverse orthogonal transform process on the transform coefficient data input from the inverse quantization section 21 to thereby restore the predicted error data. Then, the inverse orthogonal transform section 22 outputs the restored predicted error data to the addition section 23.

The addition section 23 adds the restored predicted error data input from the inverse orthogonal transform section 22 and the predicted image data input from the mode selection section 50 to thereby generate decoded image data. Then, the addition section 23 outputs the generated decoded image data to the deblocking filter 24 and the frame memory 25.

A deblocking filter 24 performs a filtering process to decrease block distortion that occurs during image encoding. The deblocking filter 24 eliminates the block distortion by filtering decoded image data input from the addition section 23, and then, after the filtering, outputs the decoded image data to the frame memory 25.

The frame memory 25 stores, using a storage medium, the decoded image data input from the addition section 23 and the decoded image data after filtering input from the deblocking filter 24.

The selector 26 reads, from the frame memory 25, the decoded image data before filtering that is to be used for the intra prediction, and supplies the decoded image data which has been read to the intra prediction section 30 as reference image data. Also, the selector 26 reads, from the frame memory 25, the decoded image data after filtering to be used for the inter prediction, and supplies the decoded image data which has been read to the motion estimation section 40 as reference image data.

The intra prediction section 30 performs an intra prediction process in each intra prediction mode, based on the image data to be encoded that is input from the reordering buffer 12 and the decoded image data supplied via the selector 26. For example, the intra prediction section 30 evaluates the prediction result of each intra prediction mode using a predetermined cost function. Then, the intra prediction section 30 selects an intra prediction mode by which the cost function value is the smallest, that is, an intra prediction mode by which the compression ratio is the highest, as the optimal intra prediction mode. Furthermore, the intra prediction section 30 outputs, to the mode selection section 50, prediction mode information indicating the optimal intra prediction mode, the predicted image data, and the information about intra prediction such as the cost function value.

A motion estimation section 40 performs an inter prediction process (prediction process between frames) based on image data for encoding supplied from a reordering buffer 12 and decoded image data supplied via a selector 26. For example, the motion estimation section 40 evaluates the prediction result of each prediction mode using a predetermined cost function. Then, the motion estimation section 40 selects an optimal prediction mode, namely, a prediction mode that minimizes the cost function value or maximizes the compression ratio. The motion estimation section 40 generates predicted image data according to the optimal prediction mode. The motion estimation section 40 outputs information about the inter prediction such as information related to the inter prediction including prediction mode information indicating the optimal intra prediction mode, the predicted image data, and the cost function value to a mode selection section 50.

The mode selection section 50 compares the cost function value related to the intra prediction input from the intra prediction section 30 and the cost function value related to the inter prediction input from the motion estimation section 40. Then, the mode selection section 50 selects a prediction method with a smaller cost function value, from the intra prediction and the inter prediction. In the case of selecting the intra prediction, the mode selection section 50 outputs the information about intra prediction to the lossless encoding section 16, and also, outputs the predicted image data to the subtraction section 13 and the addition section 23. Also, in the case of selecting the inter prediction, the mode selection section 50 outputs the information about inter prediction described above to the lossless encoding section 16, and also, outputs the predicted image data to the subtraction section 13 and the addition section 23.

[1-2. Configuration Example of the Orthogonal Transformation and Quantization Section]

Figure 2:
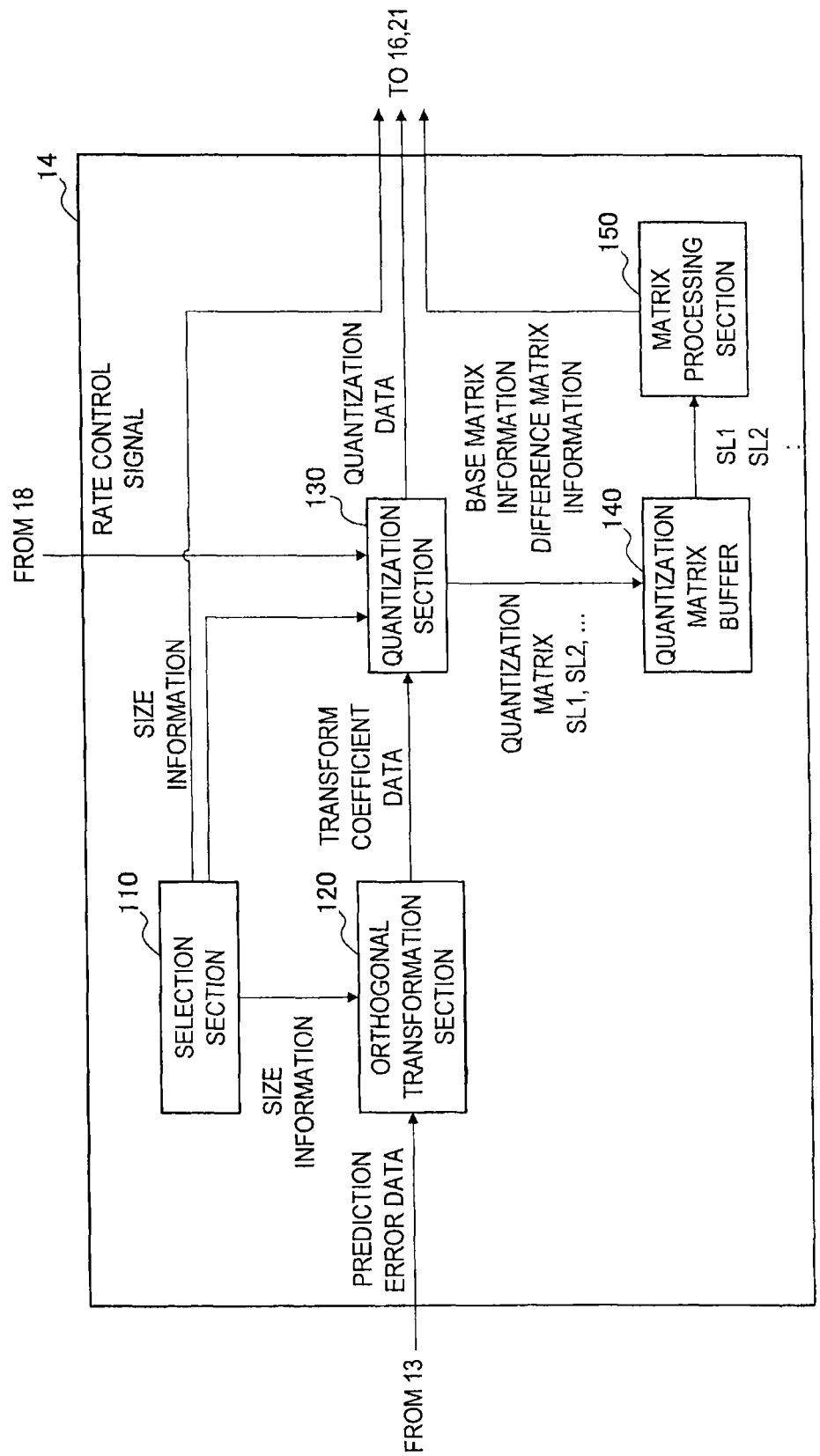
FIG. 2 is a block diagram illustrating a detailed configuration of an orthogonal transformation and quantization section according to an embodiment.

FIG. 2 is a block diagram illustrating a detailed configuration of the orthogonal transformation and quantization section 14 of the image encoding device 10 illustrated in FIG. 1. With reference to FIG. 2, the orthogonal transformation and quantization section 14 includes a selection section 110, an orthogonal transformation section 120, a quantization section 130, a quantization matrix buffer 140, and a matrix processing section 15.

(1) Selection Section

The selection section 110 selects a transform unit (TU) used for orthogonal transformation of image data to be encoded from multiple transform units having different sizes. Size candidates of transform units to be selected by the selection section 110 include 4×4 and 8×8 for H.264/AVC and 4×4, 8×8, 16×16, and 32×32 for HEVC. The selection section 110 may select any of transform units according to the size of an image to be encoded, image quality, or apparatus performance, for example. A user who develops apparatuses may manually tune selection of transform units by the selection section 110. The selection section 110 outputs information specifying the size of the selected transform unit to the orthogonal transformation section 120, the quantization section 130, the lossless encoding section 16, and the inverse quantization section 21.

(2) Orthogonal Transformation Section

The orthogonal transformation section 120 orthogonally transforms image data (i.e., prediction error data) supplied from the subtraction section 13 using the transform unit selected by the selection section 110. Orthogonal transformation performed by the orthogonal transformation section 120 may represent discrete cosine transform (DCT) or Karhunen-Loeve transform, for example. The orthogonal transformation section 120 outputs transform coefficient data acquired by an orthogonal transformation process to the quantization section 130.

(3) Quantization Section

The quantization section 130 quantizes transform coefficient data generated by the orthogonal transformation section 120 using a quantization matrix corresponding to the transform unit selected by the selection section 110. The quantization section 130 varies a bit rate of output quantized data by changing quantization steps based on a rate control signal from the rate control section 18.

The quantization section 130 allows the quantization matrix buffer 140 to store sets of quantization matrices corresponding to transform units selected by the selection section 110. For example, HEVC provides transform unit candidates of four size types such as 4×4, 8×8, 16×16, and 32×32. In such a case, the quantization matrix buffer 140 can store four types of quantization matrix sets corresponding to the four size types. There may be a case where a specific size uses a default quantization matrix as shown in FIG. 19. In such a case, the quantization matrix buffer 140 may store only a flag indicating the use of the default quantization matrix (not using a user-defined quantization matrix) in association with the specific size.

A set of quantization matrices the quantization section 130 may use can be typically configured for each sequence of encoded streams. If a set of quantization matrices is configured for each sequence, the quantization section 130 may update the set for each picture. Information to control the configuration and the update of sets of quantization matrices can be inserted into a sequence parameter set and a picture parameter set, for example.

(4) Quantization Matrix Buffer

The quantization matrix buffer 140 uses a storage medium such as semiconductor memory to temporarily store sets of quantization matrices corresponding to transform units selected by the selection section 110. A process performed by the matrix processing section 150 to be described below references a set of quantization matrices stored by the quantization matrix buffer 140.

(5) Matrix Processing Section

The matrix processing section 150 references a set of quantization matrices stored in the quantization matrix buffer 140 for each sequence of encoded streams and each picture and generates information that generates a quantization matrix corresponding to a transform unit of one or more sizes from another quantization matrix corresponding to a transform unit of one size. A quantization matrix may be generated typically based on the minimum of transform unit sizes. If HEVC provides transform unit candidates of four size types such as 4×4, 8×8, 16×16, and 32×32, a 4×4 quantization matrix can be used to generate the information that generates quantization matrices of the other sizes. The information generated by the matrix processing section 15 may include basic matrix information and difference matrix information to be described later. The information generated by the matrix processing section 150 is output to the lossless encoding section 16 and may be inserted into the encoded stream header.

The specification mainly describes an example of generating a quantization matrix of a larger size from a quantization matrix of the minimum size. While not limited thereto, a quantization matrix having a smaller size and/or a larger size may be generated from a quantization matrix having a size other than the minimum.

[1-3. Detailed Configuration Example of the Matrix Processing Section]

Figure 3:
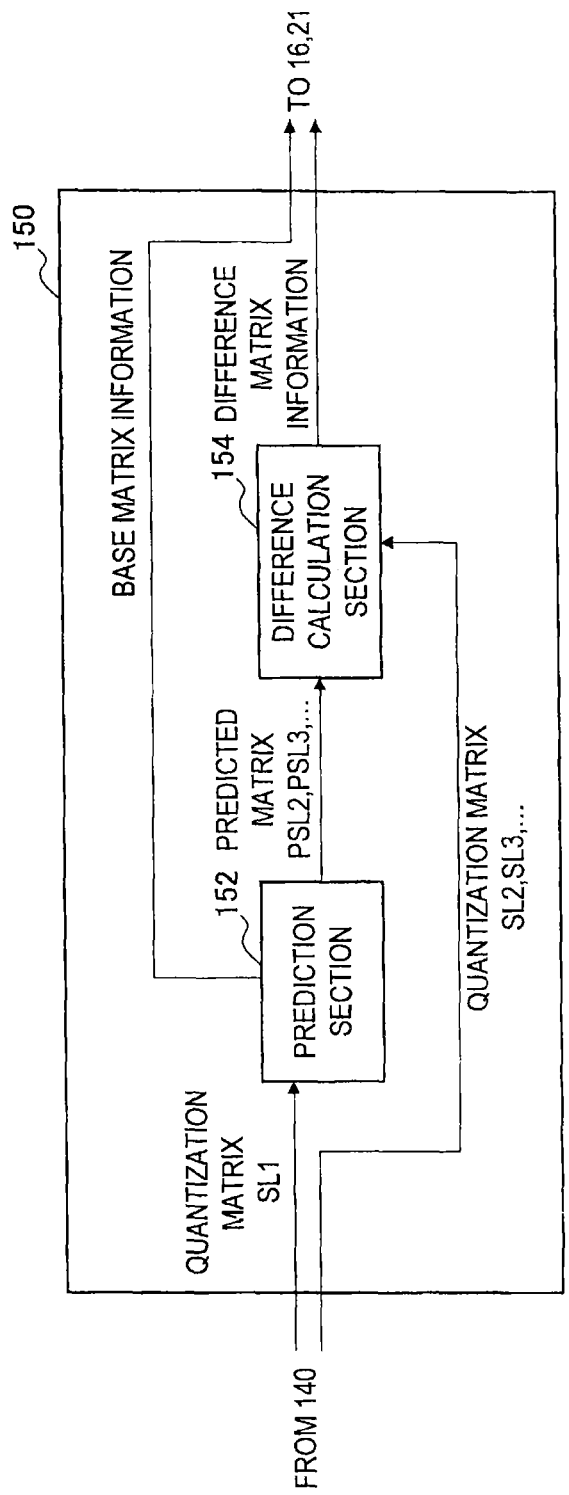
FIG. 3 is a block diagram illustrating a more detailed configuration of a matrix processing section according to an embodiment.

FIG. 3 is a block diagram illustrating a more detailed configuration of the matrix processing section 150 of the orthogonal transformation and quantization section 14 illustrated in FIG. 2. With reference to FIG. 3, the matrix processing section 150 includes a prediction section 152 and a difference calculation section 154.

(1) Prediction Section

The prediction section 152 acquires a set of quantization matrices stored in the quantization matrix buffer 140 and predicts a second quantization matrix having a larger size from a first quantization matrix contained in the acquired set. For example, 4×4 quantization matrix SL1 is defined as follows.

[Math. 1]

$$SL1 = \begin{pmatrix} a_{00} & a_{10} & a_{20} & a_{30} \\ a_{01} & a_{11} & a_{21} & a_{31} \\ a_{02} & a_{12} & a_{22} & a_{32} \\ a_{03} & a_{13} & a_{23} & a_{33} \end{pmatrix} \quad (1)$$

For example, 8×8 predicted matrix PSL2 can be predicted by the prediction section 152 from quantization matrix SL1 and calculated as follows according to prediction expression (2) below.

[Math. 2]

$$PSL2 = \begin{pmatrix} a_{00} & a_{00} & a_{10} & a_{10} & a_{20} & a_{20} & a_{30} & a_{30} \\ a_{00} & a_{00} & a_{10} & a_{10} & a_{20} & a_{20} & a_{30} & a_{30} \\ a_{01} & a_{01} & a_{11} & a_{11} & a_{21} & a_{21} & a_{31} & a_{31} \\ a_{01} & a_{01} & a_{11} & a_{11} & a_{21} & a_{21} & a_{31} & a_{31} \\ a_{02} & a_{02} & a_{12} & a_{12} & a_{22} & a_{22} & a_{32} & a_{32} \\ a_{02} & a_{02} & a_{12} & a_{12} & a_{22} & a_{22} & a_{32} & a_{32} \\ a_{03} & a_{03} & a_{13} & a_{13} & a_{23} & a_{23} & a_{33} & a_{33} \\ a_{03} & a_{03} & a_{13} & a_{13} & a_{23} & a_{23} & a_{33} & a_{33} \end{pmatrix} \quad (2)$$

With reference to prediction expression (2), duplicating one of two elements adjacent to each other in quantization matrix SL1 generates predicted matrix PSL2 as an element between the two elements.

Instead, predicted matrix PSL2 may be calculated from quantization matrix SL1 according to prediction expression (3) below.

[Math. 3]

$$PSL2 = \begin{pmatrix} a_{00} & \frac{a_{00}+a_{10}+1}{2} & a_{10} & \frac{a_{10}+a_{20}+1}{2} & a_{20} & \frac{a_{20}+a_{30}+1}{2} & a_{30} & a_{30} \\ \frac{a_{00}+a_{01}+1}{2} & \frac{a_{00}+a_{11}+1}{2} & \frac{a_{10}+a_{11}+1}{2} & \frac{a_{10}+a_{21}+1}{2} & \frac{a_{20}+a_{21}+1}{2} & \frac{a_{20}+a_{31}+1}{2} & \frac{a_{30}+a_{31}+1}{2} & \frac{a_{30}+a_{31}+1}{2} \\ a_{01} & \frac{a_{01}+a_{11}+1}{2} & a_{11} & \frac{a_{11}+a_{21}+1}{2} & a_{21} & \frac{a_{21}+a_{31}+1}{2} & a_{31} & a_{31} \\ \frac{a_{01}+a_{02}+1}{2} & \frac{a_{01}+a_{12}+1}{2} & \frac{a_{11}+a_{12}+1}{2} & \frac{a_{11}+a_{22}+1}{2} & \frac{a_{21}+a_{22}+1}{2} & \frac{a_{21}+a_{32}+1}{2} & \frac{a_{31}+a_{32}+1}{2} & \frac{a_{31}+a_{32}+1}{2} \\ a_{02} & \frac{a_{02}+a_{12}+1}{2} & a_{12} & \frac{a_{12}+a_{22}+1}{2} & a_{22} & \frac{a_{22}+a_{32}+1}{2} & a_{32} & a_{32} \\ \frac{a_{02}+a_{03}+1}{2} & \frac{a_{02}+a_{13}+1}{2} & \frac{a_{12}+a_{13}+1}{2} & \frac{a_{12}+a_{23}+1}{2} & \frac{a_{22}+a_{23}+1}{2} & \frac{a_{22}+a_{33}+1}{2} & \frac{a_{32}+a_{33}+1}{2} & \frac{a_{32}+a_{33}+1}{2} \\ a_{03} & \frac{a_{03}+a_{13}+1}{2} & a_{13} & \frac{a_{13}+a_{23}+1}{2} & a_{23} & \frac{a_{23}+a_{33}+1}{2} & a_{33} & a_{33} \\ a_{03} & \frac{a_{03}+a_{13}+1}{2} & a_{13} & \frac{a_{13}+a_{23}+1}{2} & a_{23} & \frac{a_{23}+a_{33}+1}{2} & a_{33} & a_{33} \end{pmatrix} \quad (3)$$

With reference to prediction expression (3), linearly interpolating two elements adjacent to each other in quantization matrix SL1 generates predicted matrix PSL2 as an element between the two elements. Prediction expression (3) duplicates the right-end element in predicted matrix PSL2 from the adjacent element to the left. Instead of the duplication, the linear extrapolation may be used to calculate the right-end elements. Similarly, the linear extrapolation may be used to calculate the bottom element in predicted matrix PSL2 according to prediction expression (3) instead of duplicating the adjacent element just above. For example, prediction expression (3) yields $a_{33}$ for element $PSL2_{8,8}$ at the eighth row and the eight column in predicted matrix PSL2. The same element may be also calculated as follows according to the linear extrapolation.

[Math. 4]

$$PSL2_{8,8} = \frac{a_{33} - a_{22} + 1}{2} + a_{33} \quad (4)$$

Prediction expression (2) can generate predicted matrix PSL2 at less calculation costs than prediction expression (3). The use of prediction expression (3) can generate a smooth predicted matrix more approximate to a quantization matrix to be used originally. Therefore, the use of prediction expression (3) can reduce the amount of encoded information by approximately zeroing elements of a difference matrix to be described later.

Prediction expressions and (2) and (3) are mere examples of available prediction expressions. Any other prediction expressions may be used.

After generating predicted matrix PSL2 from quantization matrix SL1, the prediction section 152 outputs the generated predicted matrix PSL2 to the difference calculation section 154. For example, the prediction section 152 predicts 16×16 predicted matrix PSL3 from 8×8 quantization matrix SL2 contained in the set of quantization matrices and outputs predicted matrix PSL3 to the difference calculation section 154. Further, the prediction section 152 predicts 32×32 predicted matrix PSL4 from 16×16 quantization matrix SL3 contained in the set of quantization matrices and outputs predicted matrix PSL4 to the difference calculation section 154. A prediction expression which is equal to the above-described prediction expression (2) or (3) may be used to predict predicted matrices PSL3 and PSL4. The prediction section 152 outputs the basic matrix information to the lossless encoding section 16. The basic matrix information specifies 4×4 quantization matrix SL1 as a base of generating the above-described predicted matrices PSL2, PSL3, and PSL4.

(2) Difference Calculation Section

The difference calculation section 154 calculates difference matrices DSL2, DSL3, and DSL4 according to expressions (5) through (7). Each of difference matrices DSL2, DSL3, and DSL4 represents a difference between each of predicted matrices PSL2, PSL3, and PSL4 supplied from the prediction section 152 and each of corresponding quantization matrices SL2, SL3, and SL4.

[Math. 5]

$$DSL2 = SL2 - PSL2 \quad (5)$$

$$DSL3 = SL3 - PSL3 \quad (6)$$

$$DSL4 = SL4 - PSL4 \quad (7)$$

The difference calculation section 154 supplies the lossless encoding section 16 with information representing difference matrices DSL2, DSL3, and DSL4.

If the default quantization matrix is used for a given size, the matrix processing section 150 does not perform prediction and difference calculation on a quantization matrix of that size. Instead, the matrix processing section 150 supplies the lossless encoding section 16 with only a flag indicating the use of the default quantization matrix in association with the corresponding size. If there is no difference between the predicted matrix and the quantization matrix, the difference calculation section 154 does not output difference matrix information but outputs only a flag indicating no difference to the lossless encoding section 16. If the quantization matrix is not updated at the timing to change a picture, the matrix processing section 150 can supply the lossless encoding section 16 with only a flag indicating that the quantization matrix is not updated.

[1-4. Examples of Information to be Encoded]

(1) Sequence Parameter Set

FIG. 4 is an explanatory diagram illustrating information inserted into a sequence parameter set according to the embodiment. FIG. 4 shows three types of information such as "matrix type flag," "difference flag," and "matrix information (to be encoded)" as information to be encoded for each quantization matrix size or transform unit (TU) size.

The matrix type flag specifies whether to use a user-defined quantization matrix or a default quantization matrix for each size. If the matrix type flag is set to 1 for a given size, a user-defined quantization matrix is used for the size. If the matrix type flag is set to 0 for a given size, a default quantization matrix is used for the size. If the matrix type flag is set to 0, none of the matrix information, the difference matrix information, and the difference flag described below is encoded.

The difference flag identifies whether there is a difference between the predicted matrix and the quantization matrix if the matrix type flag is set to 1 for each size to indicate the user-defined quantization matrix. If the matrix type flag is set to 1 for a given size, there is a difference between the predicted matrix and the quantization matrix for the size and the difference matrix information is encoded. If the matrix type flag is set to 0 for a given size, the difference matrix information for the size is not encoded. The difference flag is not encoded for the size (e.g., 4×4) as a prediction base regardless of the matrix type flag.

(2) Picture Parameter Set

FIG. 5 is an explanatory diagram illustrating information inserted into a picture parameter set according to the embodiment. FIG. 5 shows four types of information such as "update flag," "matrix type flag," "difference flag," and "matrix information (to be encoded)" as information to be encoded for each quantization matrix size or transform unit (TU) size. The matrix type flag and the difference flag have the same meanings as the flags with the same names for sequence parameter sets described with reference to FIG. 4.

The update flag indicates whether to update the quantization matrix at the timing of changing a picture for each size. If the update flag is set to 1 for a given size, a quantization matrix of the size is updated. If the update flag is set to 0, a quantization matrix of the size is not updated and a quantization matrix specified for the previous picture or the current sequence is used as is. If the update flag is set to 0, none of the matrix type flag, the difference flag, and the difference matrix information (or the matrix information for 4×4) for the size is encoded.

<2. Encoding Process Flow According To An Embodiment>

Figure 6A:
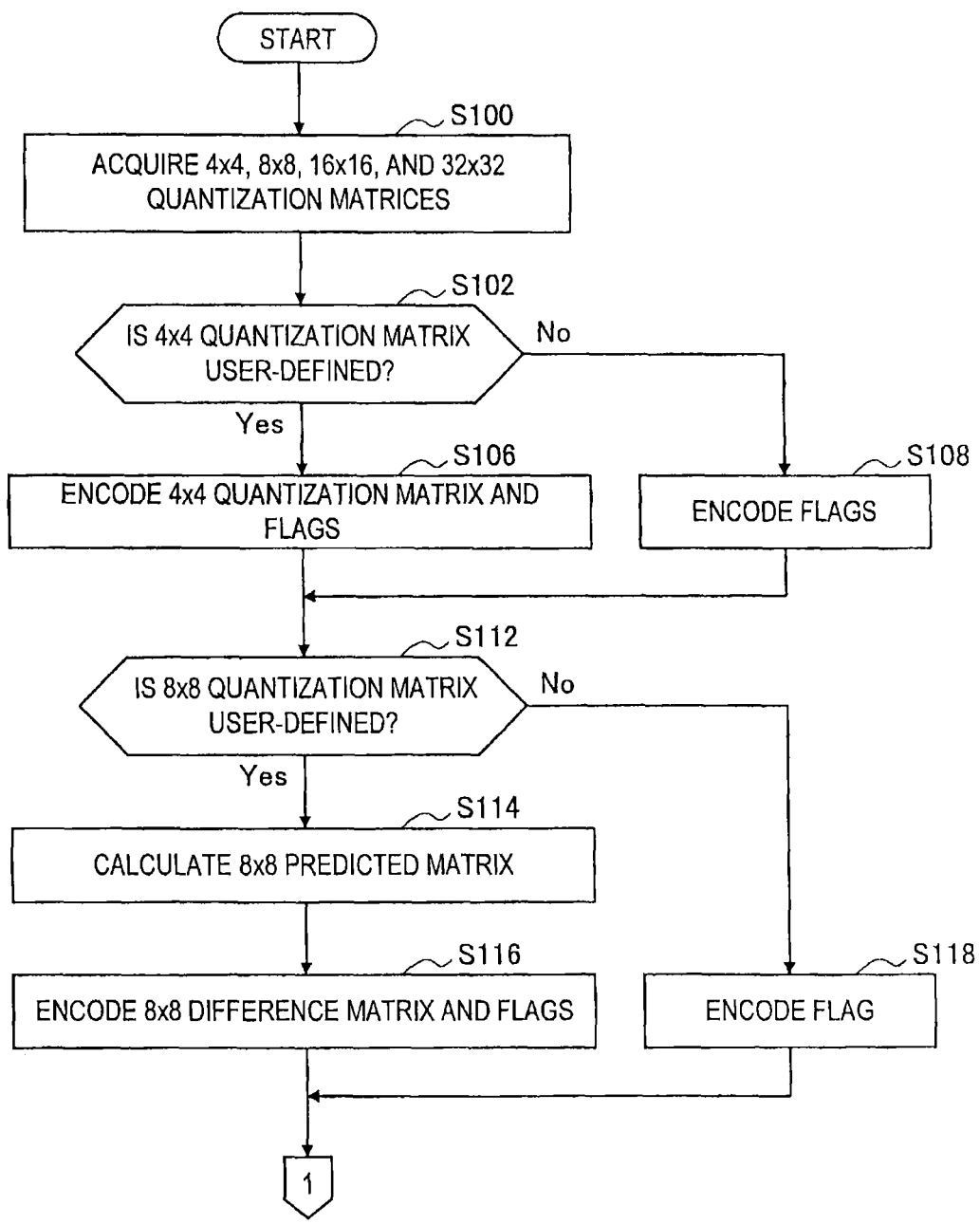
FIG. 6A is the first half of a flowchart illustrating a first example of encoding process flow according to an embodiment.

FIGS. 6A and 6B are flowcharts illustrating a first example of encoding process flow according to the embodiment. The matrix processing section 150 and the lossless encoding section 16 can perform the process represented by the flowcharts mainly on each encoded stream sequence.

With reference to FIG. 6A, the matrix processing section 150 acquires a set of quantization matrices used for the quantization section 130 in this sequence from the quantization matrix buffer 140 (step S100). As an example, the set of quantization matrices is assumed to contain quantization matrices corresponding to the sizes of 4×4, 8×8, 16×16, and 32×32.

The matrix processing section 150 determines whether a 4×4 quantization matrix is a user-defined one (step S102). If the 4×4 quantization matrix is a user-defined one, the lossless encoding section 16 encodes the basic matrix information that represents a 4×4 quantization matrix with the matrix type flag set to 1 (step S106). If the 4×4 quantization matrix is a default one, the lossless encoding section 16 encodes only the matrix type flag set to 0 (step S108).

The matrix processing section 150 determines whether an 8×8 quantization matrix is a user-defined one (step S112). If the 8×8 quantization matrix is a user-defined one, the matrix processing section 150 uses the above-described prediction expression (2) or (3) to calculate an 8×8 predicted matrix from the 4×4 quantization matrix (step S114). The lossless encoding section 16 encodes the matrix type flag (=1), the difference flag, and the difference matrix information (if any) indicating a difference between the 8×8 quantization matrix and the calculated predicted matrix (step S116). If the 8×8 quantization matrix is a default one, the lossless encoding section 16 encodes only the matrix type flag set to 0 (step S118).

With reference to FIG. 6B, the matrix processing section 150 determines whether a 16×16 quantization matrix is a user-defined one (step S122). If the 16×16 quantization matrix is a user-defined one, the matrix processing section 150 calculates a 16×16 predicted matrix from the 8×8 quantization matrix (step S124). The lossless encoding section 16 encodes the matrix type flag (=1), the difference flag, and the difference matrix information (if any) indicating a difference between the 16×16 quantization matrix and the calculated predicted matrix (step S126). If the 16×16 quantization matrix is a default one, the lossless encoding section 16 encodes only the matrix type flag set to 0 (step S128).

The matrix processing section 150 determines whether a 32×32 quantization matrix is a user-defined one (step S132). If the 32×32 quantization matrix is a user-defined one, the matrix processing section 150 calculates a 32×32 predicted matrix from the 16×16 quantization matrix (step S134). The lossless encoding section 16 encodes the matrix type flag (=1), the difference flag, and the difference matrix information (if any) indicating a difference between the 32×32 quantization matrix and the calculated predicted matrix (step S136). If the 32×32 quantization matrix is a default one, the lossless encoding section 16 encodes only the matrix type flag set to 0 (step S138).

Figure 7B:
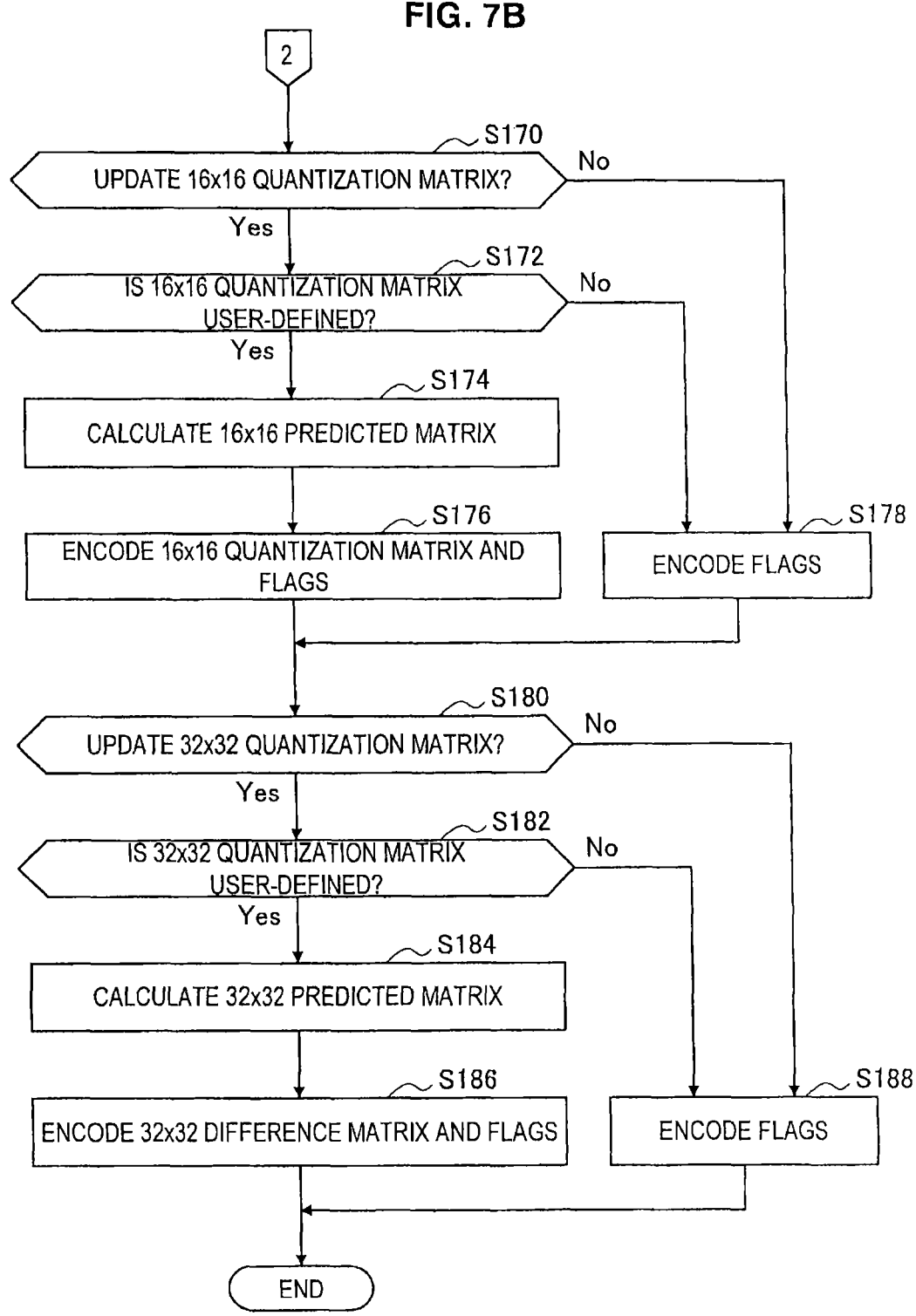
FIG. 7B is the latter half of a flowchart illustrating the second example of encoding process flow according to an embodiment.

FIGS. 7A and 7B are flowcharts illustrating a second example of encoding process flow according to the embodiment. The matrix processing section 150 and the lossless encoding section 16 can perform the process represented by the flowcharts mainly on each picture corresponding to an encoded stream sequence.

With reference to FIG. 7A, the matrix processing section 150 acquires a set of quantization matrices used for the quantization section 130 in the picture from the quantization matrix buffer 140 (step S150). Similarly to the examples in FIGS. 6A and 6B, the set of quantization matrices is assumed to contain quantization matrices corresponding to the sizes of 4×4, 8×8, 16×16, and 32×32.

The matrix processing section 150 determines whether a 4×4 quantization matrix is updated in the picture (step S152). If the quantization matrix is not updated, the lossless encoding section 16 encodes only the update flag set to 0 (step S158). If the quantization matrix is updated, the process proceeds to step S154. If the quantization matrix is updated, the matrix processing section 150 determines whether a new 4×4 quantization matrix is a user-defined one (step S154). If the 4×4 quantization matrix is a user-defined one, the lossless encoding section 16 encodes the basic matrix information that represents a 4×4 quantization matrix with the update flag set to 1 and the matrix type flag set to 1 (step S156). If the 4×4 quantization matrix is a default one, the lossless encoding section 16 encodes the update flag set to 1 and the matrix type flag set to 0 (step S158).

The matrix processing section 150 determines whether an 8×8 quantization matrix is updated in the picture (step S160). If the quantization matrix is not updated, the lossless encoding section 16 encodes only the update flag set to 0 (step S168). If the quantization matrix is updated, the process proceeds to step S162. If the quantization matrix is updated, the matrix processing section 150 determines whether an 8×8 quantization matrix is a user-defined one (step S162). If the 8×8 quantization matrix is a user-defined one, the matrix processing section 150 calculates an 8×8 predicted matrix from the 4×4 quantization matrix for a new picture regardless of whether the 4×4 quantization matrix is updated (step S164). The lossless encoding section 16 encodes the update flag (=1), the matrix type flag (=1), the difference flag, and the difference matrix information (if any) indicating a difference between the 8×8 quantization matrix and the calculated predicted matrix (step S166). If the 8×8 quantization matrix is a default one, the lossless encoding section 16 encodes the update flag set to 1 and the matrix type flag set to 0 (step S168).

With reference to FIG. 7B, the matrix processing section 150 determines whether a 16×16 quantization matrix is updated in the picture (step S170). If the quantization matrix is not updated, the lossless encoding section 16 encodes only the update flag set to 0 (step S178). If the quantization matrix is updated, the process proceeds to step S172. If the quantization matrix is updated, the matrix processing section 150 determines whether a 16×16 quantization matrix is a user-defined one (step S172). If the 16×16 quantization matrix is a user-defined one, the matrix processing section 150 calculates a 16×16 predicted matrix from the 8×8 quantization matrix for a new picture regardless of whether the 8×8 quantization matrix is updated (step S174). The lossless encoding section 16 encodes the update flag (=1), the matrix type flag (=1), the difference flag, and the difference matrix information (if any) indicating a difference between the 16×16 quantization matrix and the calculated predicted matrix (step S176). If the 16×16 quantization matrix is a default one, the lossless encoding section 16 encodes the update flag set to 1 and the matrix type flag set to 0 (step S178).

The matrix processing section 150 determines whether a 32×32 quantization matrix is updated in the picture (step S180). If the quantization matrix is not updated, the lossless encoding section 16 encodes only the update flag set to 0 (step S188). If the quantization matrix is updated, the process proceeds to step S182. If the quantization matrix is updated, the matrix processing section 150 determines whether an 32×32 quantization matrix is a user-defined one (step S182). If the 32×32 quantization matrix is a user-defined one, the matrix processing section 150 calculates a 32×32 predicted matrix from the 16×16 quantization matrix for a new picture regardless of whether the 16×16 quantization matrix is updated (step S184). The lossless encoding section 16 encodes the update flag (=1), the matrix type flag (=1), the difference flag, and the difference matrix information (if any) indicating a difference between the 32×32 quantization matrix and the calculated predicted matrix (step S186). If the 32×32 quantization matrix is a default one, the lossless encoding section 16 encodes the update flag set to 1 and the matrix type flag set to 0 (step S188).

The technique to predict quantization matrices based on one quantization matrix can eliminate the need to transmit multiple quantization matrices corresponding to multiple transform unit sizes from the encoding side to the decoding side. An increase in the code amount can be effectively suppressed even if the number of quantization matrices increases.

<3. Configuration examples of the image decoding device according to an Embodiment>

The following describes configuration examples of the image decoding device according to an embodiment.

[3-1. Overall Configuration Example]

Figure 8:
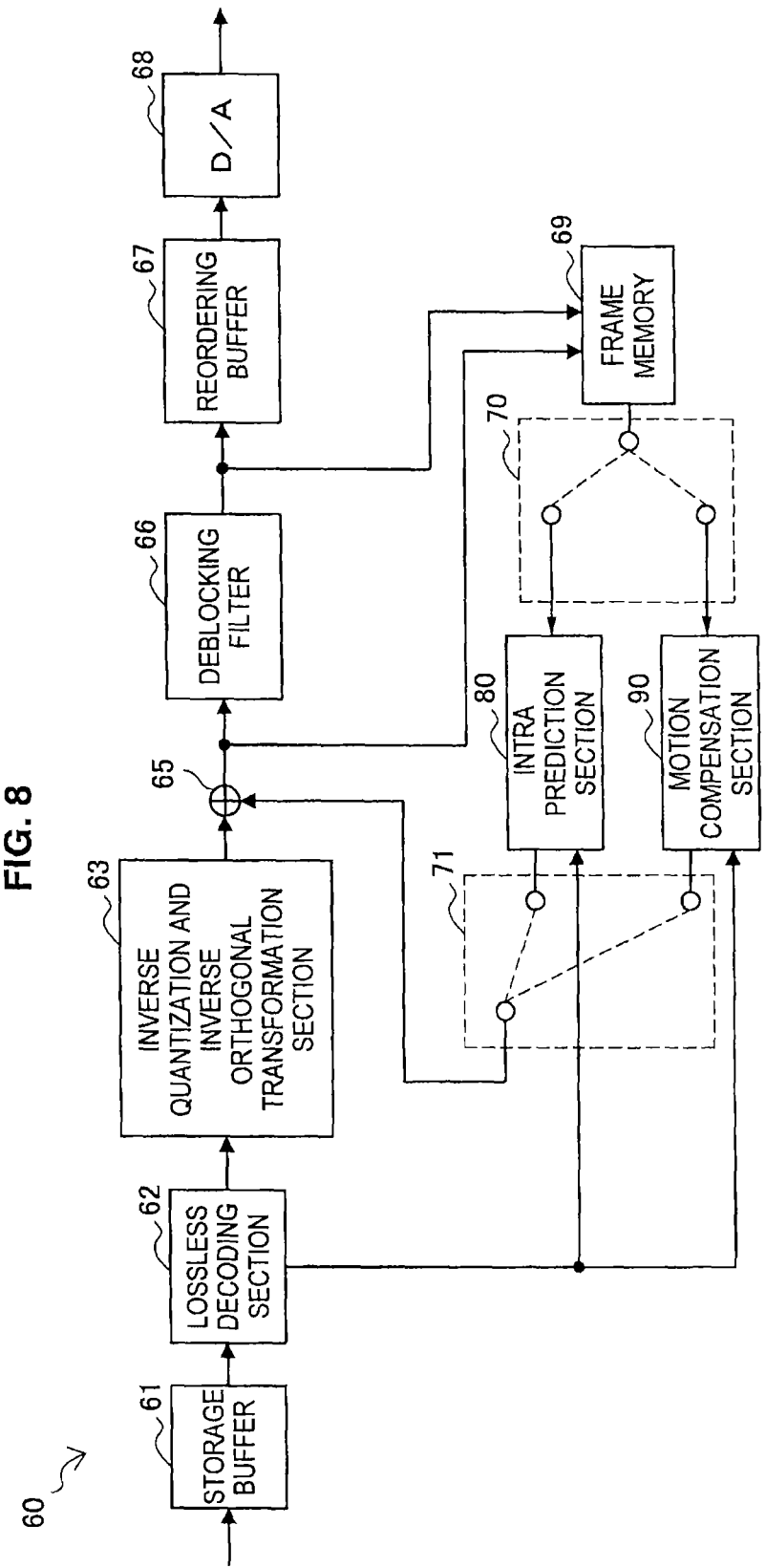
FIG. 8 is a block diagram illustrating a configuration of an image decoding device according to an embodiment.

FIG. 8 is a block diagram showing an example of a configuration of an image decoding device 60 according to an embodiment. With reference to FIG. 8, the image decoding device 60 includes an accumulation buffer 61, a lossless decoding section 62, an inverse quantization and inverse orthogonal transformation section 63, an addition section 65, a deblocking filter 66, a reordering buffer 67, a D/A (Digital to Analogue) conversion section 68, a frame memory 69, selectors 70 and 71, an intra prediction section 80, and a motion compensation section 90.

The accumulation buffer 61 temporarily stores an encoded stream input via a transmission line using a storage medium.

The lossless decoding section 62 decodes an encoded stream supplied from the storage buffer 61 according to the encoding system used for the encoding. The lossless decoding section 62 decodes information multiplexed in the header area of encoded streams. The information multiplexed in the header area of encoded streams may include the basic matrix information and the difference matrix information to generate the above-described quantization matrix and information about intra prediction and inter prediction in the block header. The lossless decoding section 62 supplies the inverse quantization and inverse orthogonal transformation section 63 with information to generate quantized data and a quantization matrix after decoding. The lossless decoding section 62 supplies the intra prediction section 80 with information about the intra prediction. The lossless decoding section 62 supplies the motion compensation section 90 with information about the inter prediction.

The inverse quantization and inverse orthogonal transformation section 63 performs inverse quantization and inverse orthogonal transformation on quantized data supplied from the lossless decoding section 62 to generate prediction error data. The inverse quantization and inverse orthogonal transformation section 63 supplies the addition section 65 with the generated prediction error data.

The addition section 65 adds the predicted error data input from the inverse quantization and inverse orthogonal transformation section 63 and predicted image data input from the selector 71 to thereby generate decoded image data. Then, the addition section 65 outputs the generated decoded image data to the deblocking filter 66 and the frame memory 69.

The deblocking filter 66 eliminates the block distortion by filtering decoded image data input from the addition section 65, and then, after the filtering, outputs the decoded image data to the reordering buffer 67 and the frame memory 69.

The reordering buffer 67 generates a series of image data in a time sequence by reordering images input from the deblocking filter 66. Then, the reordering buffer 67 outputs the generated image data to the D/A conversion section 68.

The D/A conversion section 68 converts the image data in a digital format input from the reordering buffer 67 into an image signal in an analogue format. Then, the D/A conversion section 68 causes an image to be displayed by outputting the analogue image signal to a display (not shown) connected to the image decoding device 60, for example.

The frame memory 69 uses a storage medium to store the decoded image data input from the addition section 65 before filtering and the decoded image data input from the deblocking filter 66 after filtering.

The selector 70 switches the output destination of the image data from the frame memory 69 between the intra prediction section 80 and the motion compensation section 90 for each block in the image according to mode information acquired by the lossless decoding section 62. For example, in the case the intra prediction mode is specified, the selector 70 outputs the decoded image data before filtering that is supplied from the frame memory 69 to the intra prediction section 80 as reference image data. Also, in the case the inter prediction mode is specified, the selector 70 outputs the decoded image data after filtering that is supplied from the frame memory 69 to the motion compensation section 90 as the reference image data.

The selector 71 switches the output source of predicted image data to be supplied to the addition section 65 between the intra prediction section 80 and the motion compensation section 90 for each block in the image according to the mode information acquired by the lossless decoding section 62. For example, in the case the intra prediction mode is specified, the selector 71 supplies to the addition section 65 the predicted image data output from the intra prediction section 80. In the case the inter prediction mode is specified, the selector 71 supplies to the addition section 65 the predicted image data output from the motion compensation section 90.

The intra prediction section 80 performs in-screen prediction of a pixel value based on the information about intra prediction input from the lossless decoding section 62 and the reference image data from the frame memory 69, and generates predicted image data. Then, the intra prediction section 80 outputs the generated predicted image data to the selector 71.

The motion compensation section 90 performs a motion compensation process based on the information about inter prediction input from the lossless decoding section 62 and the reference image data from the frame memory 69, and generates predicted image data. Then, the motion compensation section 90 outputs the generated predicted image data to the selector 71.

[3-2. Configuration Example of the Inverse Quantization and Inverse Orthogonal Transformation Section]

Figure 9:
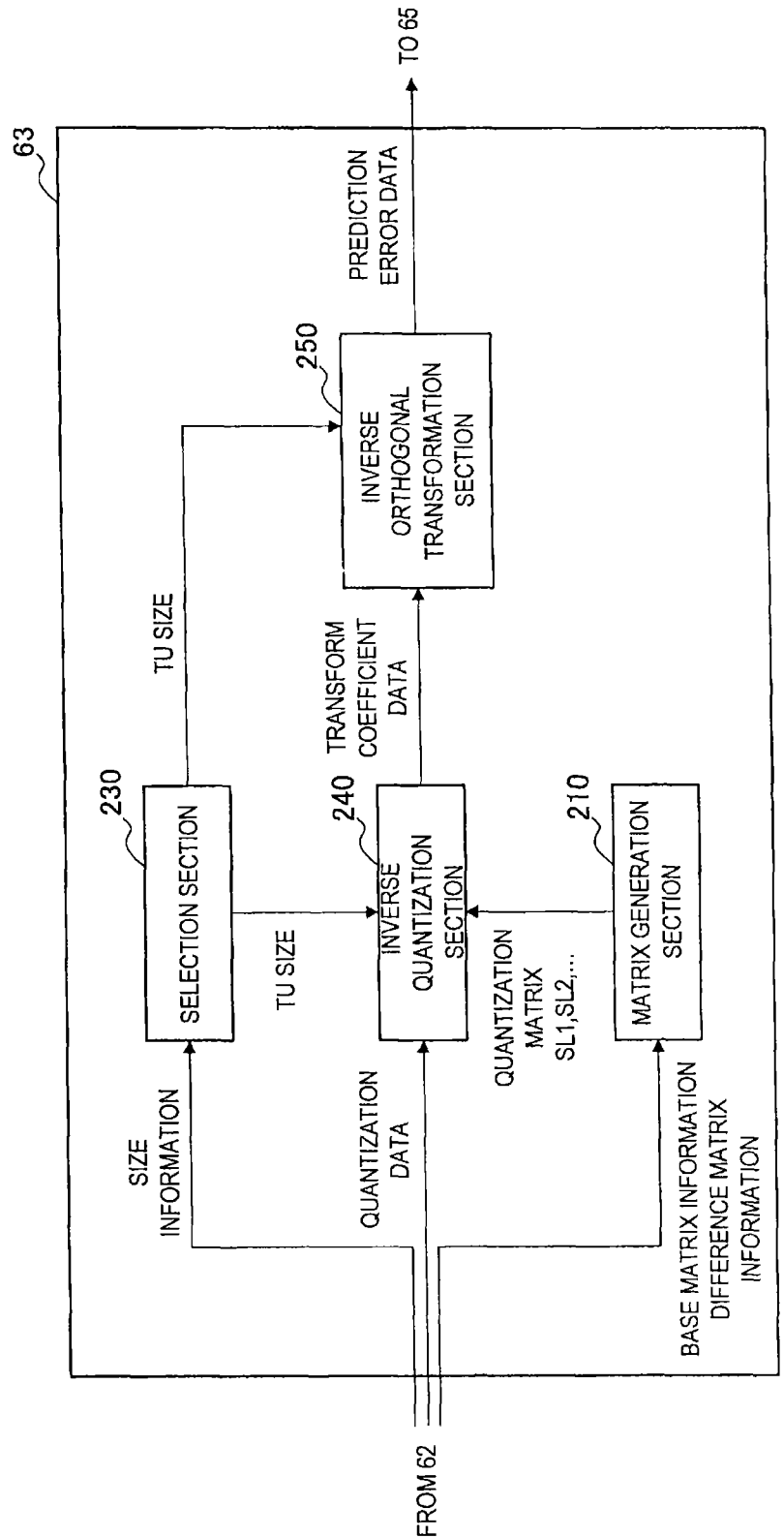
FIG. 9 is a block diagram illustrating a detailed configuration of an inverse quantization and inverse orthogonal transformation section according to an embodiment.

FIG. 9 is a block diagram illustrating a detailed configuration of the inverse quantization and inverse orthogonal transformation section 63 of the image decoding device 60 illustrated in FIG. 8. As shown in FIG. 9, the inverse quantization and inverse orthogonal transformation section 63 includes a matrix generation section 210, a selection section 230, an inverse quantization section 240, and an inverse orthogonal transformation section 250.

(1) Matrix Generation Section

The matrix generation section 210 generates a quantization matrix corresponding to transform units representing one or more sizes from a quantization matrix corresponding to a transform unit representing one size for each encoded stream sequence and picture. A quantization matrix may be generated typically based on the minimum of transform unit sizes. According to the embodiment, the matrix generation section 210 generates 8×8, 16×16, and 32×32 quantization matrices from a 4×4 quantization matrix as the minimum size using the difference matrix information about larger sizes.

(2) Selection Section

The selection section 230 selects a transform unit (TU) used for inverse orthogonal transformation of image data to be decoded from multiple transform units having different sizes. Size candidates of transform units to be selected by the selection section 230 include 4×4 and 8×8 for H.264/AVC and 4×4, 8×8, 16×16, and 32×32 for HEVC. The selection section 230 may select a transform unit based on LCU, SCU, and split_flag contained in the encoded stream header, for example. The selection section 230 outputs information specifying the size of the selected transform unit to the inverse quantization section 240 and the inverse orthogonal transformation section 250.

(3) Inverse Quantization Section

The inverse quantization section 240 uses a quantization matrix corresponding to the transform unit selected by the selection section 230 to inversely quantize transform coefficient data quantized during image encoding. Quantization matrices used for the inverse quantization contain a matrix generated by the matrix generation section 210. For example, the selection section 230 may select an 8×8, 16×16, or 32×32 transform unit. In such a case, the selected transform unit may correspond to the quantization matrix the matrix generation section 210 generates from a 4×4 quantization matrix. The inverse quantization section 240 supplies the inverse orthogonal transformation section 250 with the inversely quantized transform coefficient data.

(4) Inverse Orthogonal Transformation Section

The inverse orthogonal transformation section 250 generates prediction error data according to the orthogonal transformation system used for encoding. To do this, the inverse orthogonal transformation section 250 uses the selected transform unit to perform inverse orthogonal transformation on transform coefficient data inversely quantized by the inverse quantization section 240. The inverse orthogonal transformation section 250 supplies the addition section 65 with the generated prediction error data.

[3-3. Detailed Configuration Example of the Matrix Generation Section]

Figure 10:
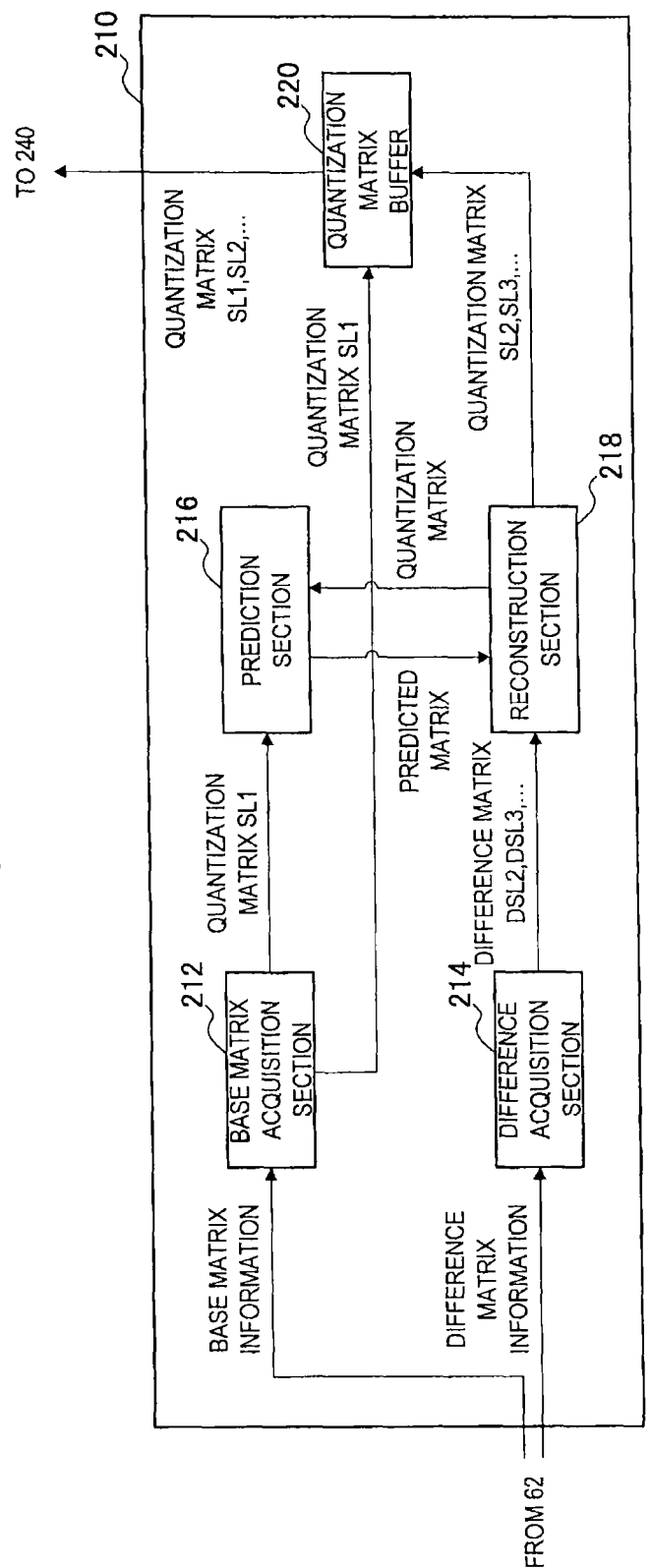
FIG. 10 is a block diagram illustrating a more detailed configuration of a matrix generation section according to an embodiment.

FIG. 10 is a block diagram illustrating a more detailed configuration of the matrix generation section 210 of the inverse quantization and inverse orthogonal transformation section 63 illustrated in FIG. 9. With reference to FIG. 10, the matrix generation section 210 includes a base matrix acquisition section 212, a difference acquisition section 214, a prediction section 216, a reconstruction section 218, and a quantization matrix buffer 220.

(1) Base Matrix Acquisition Section

The base matrix acquisition section 212 acquires basic matrix information supplied from the lossless decoding section 62. As described above, the basic matrix information according to the embodiment specifies 4×4 quantization matrix SL1 as the minimum size. The base matrix acquisition section 212 allows the quantization matrix buffer 220 to store 4×4 quantization matrix SL1 specified in the basic matrix information. If the matrix type flag set to 0 is acquired for each sequence or picture, the base matrix acquisition section 212 allows the quantization matrix buffer 220 to store the default 4×4 quantization matrix without acquiring the basic matrix information. If the update flag set to 0 is acquired for each picture, the base matrix acquisition section 212 does not update quantization matrix SL1 stored in the quantization matrix buffer 220 during the previous process. The base matrix acquisition section 212 supplies the prediction section 216 with 4×4 quantization matrix SL1.

(2) Difference Acquisition Section

The difference acquisition section 214 acquires the difference matrix information supplied from the lossless decoding section 62. As described above, the difference matrix information according to the embodiment specifies difference matrices DSL2, DSL3, and DSL4 each of which represents a difference between each of predicted matrices PSL2, PSL3, and PSL4 predicted from 4×4 quantization matrix SL1 and each of quantization matrices SL2, SL3, and SL4, respectively. The difference acquisition section 214 supplies the reconstruction section 218 with difference matrices DSL2, DSL3, and DSL4 specified in the difference matrix information. If the matrix type flag set to 0 is acquired for each sequence or picture or difference flag set to 0 is acquired, the difference acquisition section 214 assumes a difference matrix having the corresponding size to be null without acquiring the difference matrix information. If the update flag set to 0 is acquired for each picture, the difference acquisition section 214 outputs no difference matrix for the corresponding size.

(3) Prediction Section

The prediction section 216 follows the prediction expression used for the image encoding such as prediction expression (2) or (3) described above to calculate 8×8 predicted matrix PSL2 having a larger size from the base matrix such as 4×4 quantization matrix SL1 according to the embodiment supplied from the base matrix acquisition section 212. The prediction section 216 uses the calculated 8×8 predicted matrix PSL2 to calculate 16×16 predicted matrix PSL3 from quantization matrix SL2 reconstructed by the reconstruction section 218. Further, the prediction section 216 uses the calculated 16×16 predicted matrix PSL3 to calculate 32×32 predicted matrix PSL4 from quantization matrix SL3 reconstructed by the reconstruction section 218. The prediction section 216 supplies the reconstruction section 218 with predicted matrices PSL2, PSL3, and PSL4. The prediction section 216 generates no predicted matrix for a size having the matrix type flag set to 0 and uses the default quantization matrix to calculate predicted matrices having larger sizes. The base matrix acquisition section 212 generates no predicted matrix for a size having the update flag set to 0 and uses the quantization matrix generated from the previous process to calculate predicted matrices having larger sizes.

(4) Reconstruction Section

The reconstruction section 218 reconstructs quantization matrices SL2, SL3, and SL4 by adding predicted matrices PSL2, PSL3, and PSL4 supplied from the prediction section 216 to difference matrices DSL2, DSL3, and DSL4 supplied from the difference acquisition section 214, respectively.

[Math. 6]

$$SL2 = PSL2 + DSL2 \quad (8)$$

$$SL3 = PSL3 + DSL3 \quad (9)$$

$$SL4 = PSL4 + DSL4 \quad (10)$$

The reconstruction section 218 allows the quantization matrix buffer 220 to store the reconstructed quantization matrices SL2, SL3, and SL4 having sizes 8×8, 16×16, and 32×32. If the matrix type flag set to 0 is acquired for each sequence or picture, the reconstruction section 218 allows the quantization matrix buffer 220 to store the default quantization matrix as a quantization matrix having the corresponding size. If the update flag set to 0 is acquired for each picture, the base matrix acquisition section 212 does not update quantization matrix SL2, SL3, or SL4 that has the corresponding size and is stored in the quantization matrix buffer 220 during the previous process.

(5) Quantization Matrix Buffer

The quantization matrix buffer 220 temporarily stores quantization matrix SL1 specified by the base matrix acquisition section 212 and quantization matrices SL2, SL3, and SL4 reconstructed by the reconstruction section 218. Quantization matrices SL1, SL2, SL3, and SL4 stored in the quantization matrix buffer 220 are used for the inverse quantization section 240 to inversely quantize the quantized transform coefficient data.

The configuration of the inverse quantization and inverse orthogonal transformation section 63 of the image decoding device 60 described above is also applicable to the inverse quantization section 21 and the inverse orthogonal transformation section 22 of the image decoding device 10 shown in FIG. 1.

<4. Decoding process flow according to an embodiment>

Figure 11A:
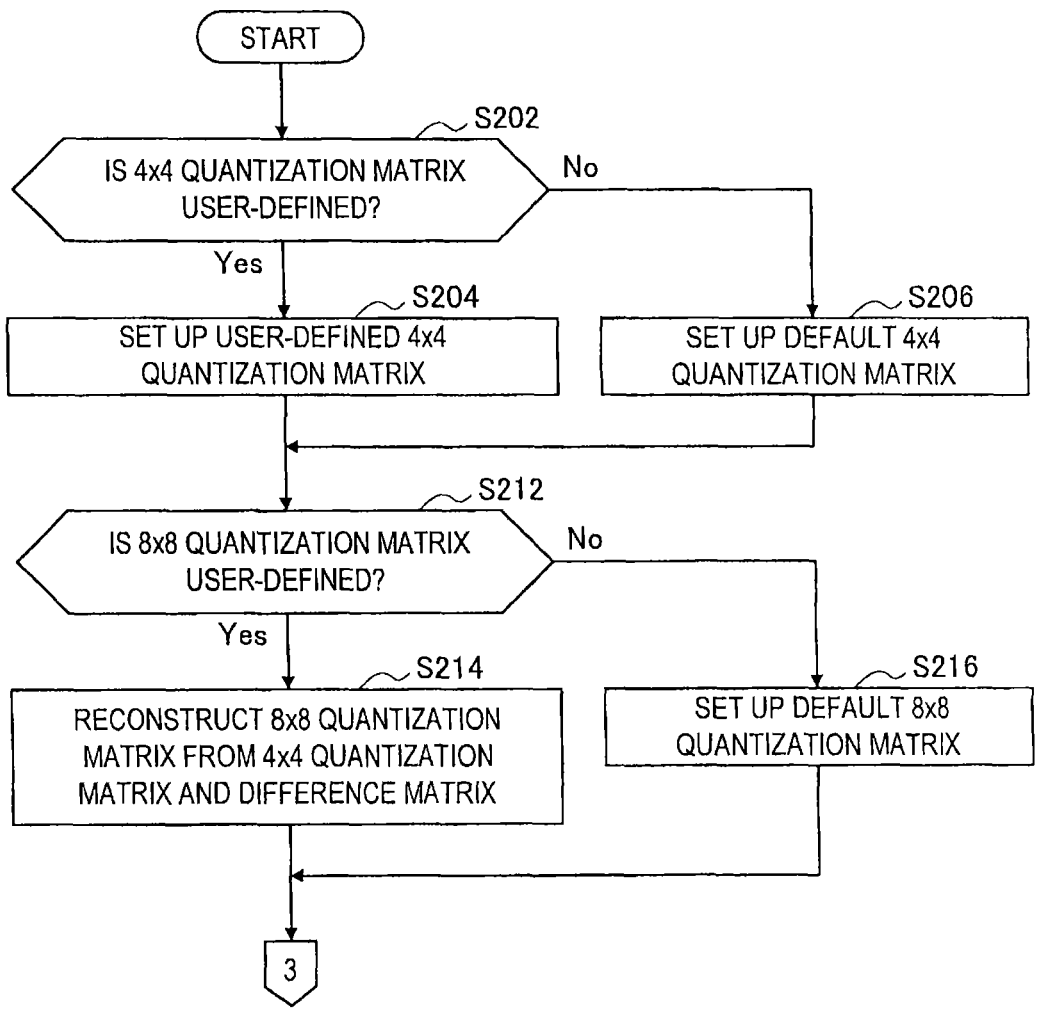
FIG. 11A is the first half of a flowchart illustrating a first example of decoding process flow according to an embodiment.
Figure 11B:
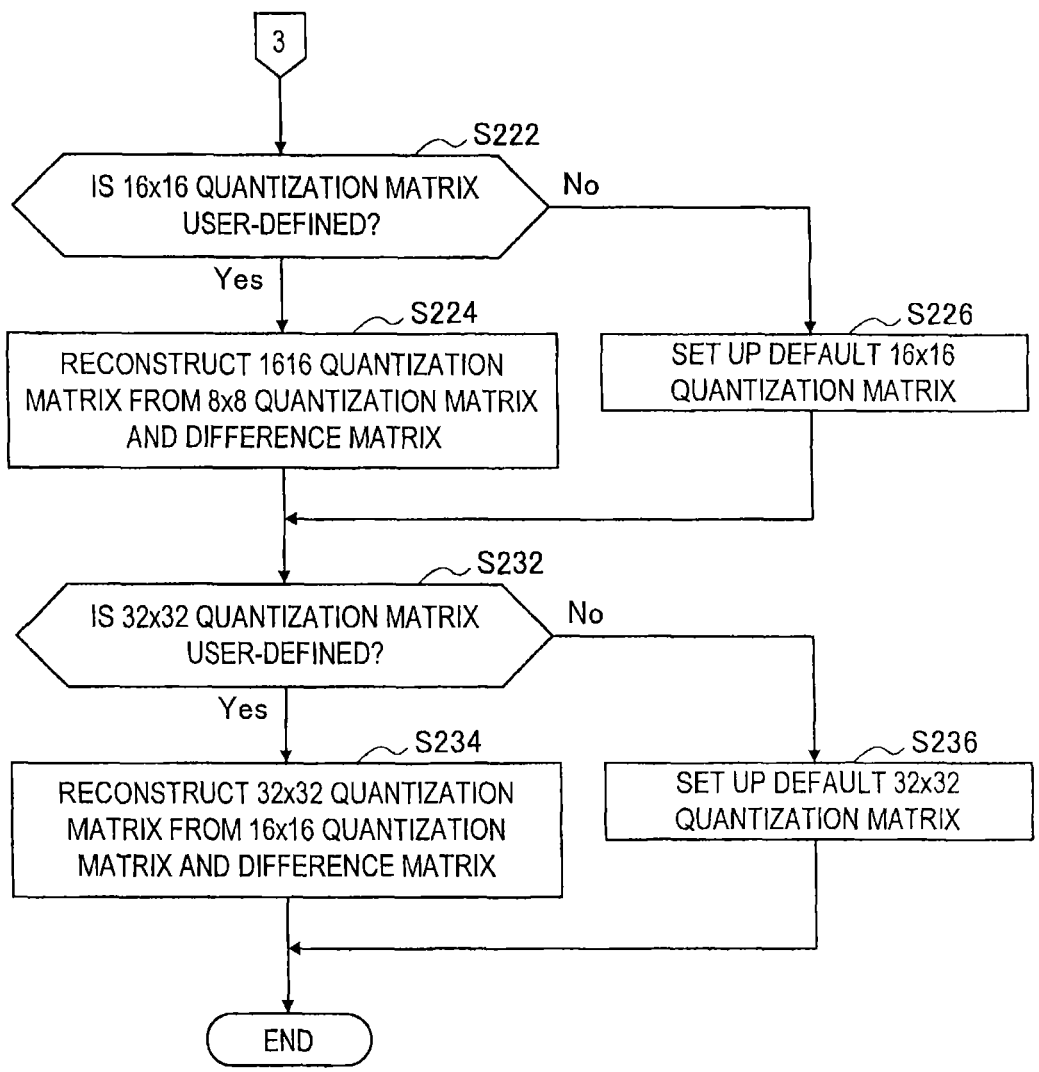
FIG. 11B is the latter half of a flowchart illustrating the first example of decoding process flow according to an embodiment.

FIGS. 11A and 11B are flowcharts illustrating a first example of decoding process flow according to the embodiment. The matrix generation section 210 can perform the process represented by the flowcharts mainly on each encoded stream sequence.

With reference to FIG. 11A, the matrix generation section 210 checks the matrix type flag contained in the sequence parameter set of the sequence to determine whether the 4×4 quantization matrix is a user-defined one (step S202). If the 4×4 quantization matrix is a user-defined one, the matrix generation section 210 uses the basic matrix information to set up the 4×4 quantization matrix, namely, store the same in the quantization matrix buffer 220 (step S204). If the 4×4 quantization matrix is a default one, the matrix generation section 210 sets up the default 4×4 quantization matrix (step S206).

The matrix generation section 210 determines whether an 8×8 quantization matrix is a user-defined one (step S212). If the 8×8 quantization matrix is a user-defined one, the matrix generation section 210 uses the above-described prediction expression (2) or (3) to calculate an 8×8 predicted matrix from the 4×4 quantization matrix and adds the calculated predicted matrix to an 8×8 difference matrix. As a result, the 8×8 quantization matrix is reconstructed (step S214). If the 8×8 difference flag is set to 0, the difference matrix is null. The 8×8 predicted matrix may be directly set up as a quantization matrix. If the 8×8 quantization matrix is a default one, the matrix generation section 210 sets up the default 8×8 quantization matrix (step S216).

With reference to FIG. 11B, the matrix generation section 210 determines whether a 16×16 quantization matrix is a user-defined one (step S222). If the 16×16 quantization matrix is a user-defined one, the matrix generation section 210 calculates a 16×16 predicted matrix from the 8×8 quantization matrix and adds the calculated predicted matrix to a 16×16 difference matrix. As a result, the 16×16 quantization matrix is reconstructed (step S224). If the 16×16 difference flag is set to 0, the difference matrix is null. The 16×16 predicted matrix is directly set up as a quantization matrix. If the 16×16 quantization matrix is a default one, the matrix generation section 210 sets up the default 16×16 quantization matrix (step S226).

The matrix generation section 210 determines whether a 32×32 quantization matrix is a user-defined one (step S232). If the 32×32 quantization matrix is a user-defined one, the matrix generation section 210 calculates a 32×32 predicted matrix from the 16×16 quantization matrix and adds the calculated predicted matrix to a 32×32 difference matrix. As a result, the 32×32 quantization matrix is reconstructed (step S234). If the 32×32 difference flag is set to 0, the difference matrix is null. The 32×32 predicted matrix is directly set up as a quantization matrix. If the 32×32 quantization matrix is a default one, the matrix generation section 210 sets up the default 32×32 quantization matrix (step S236).

Figure 12A:
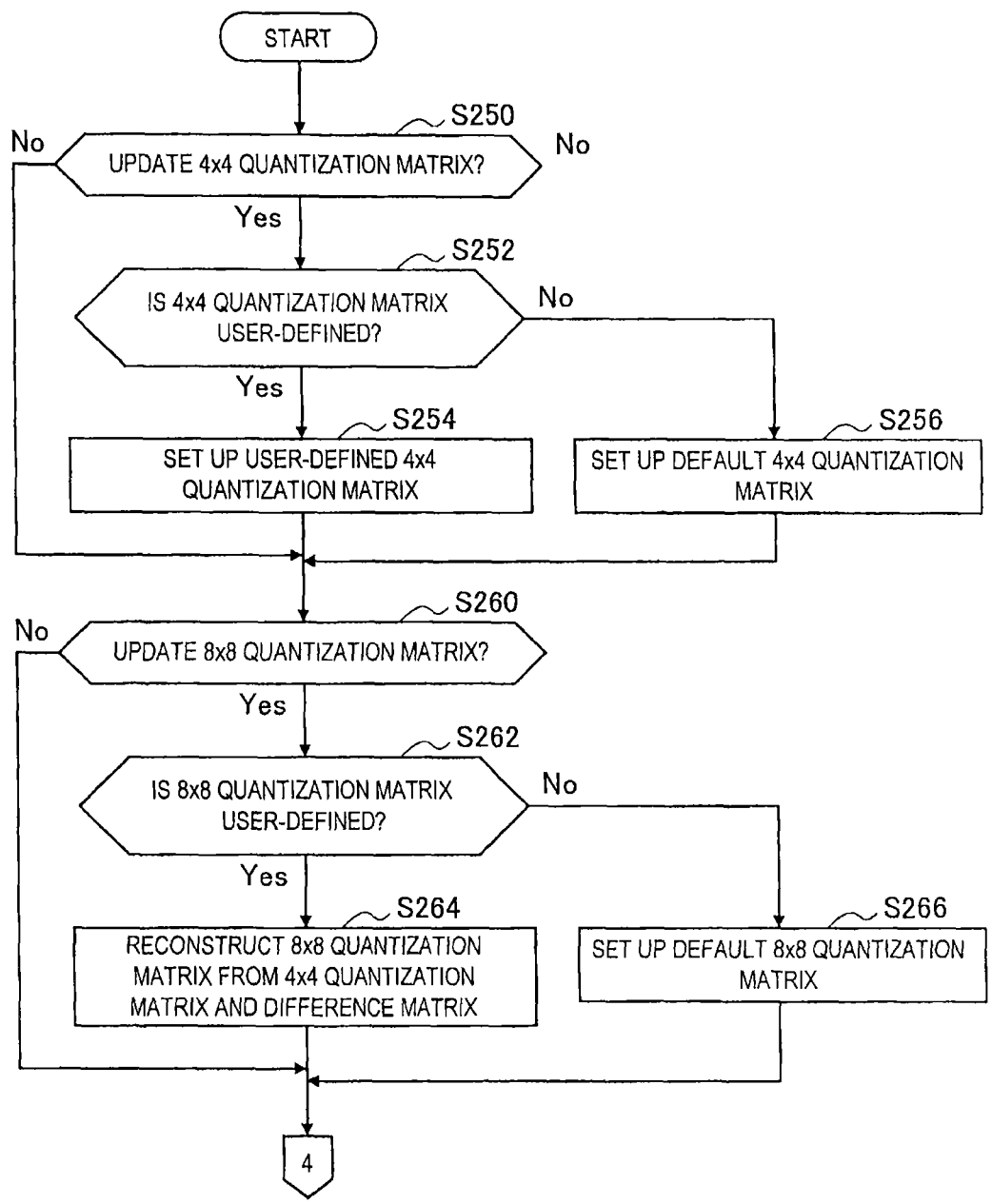
FIG. 12A is the first half of a flowchart illustrating a second example of decoding process flow according to an embodiment.
Figure 12B:
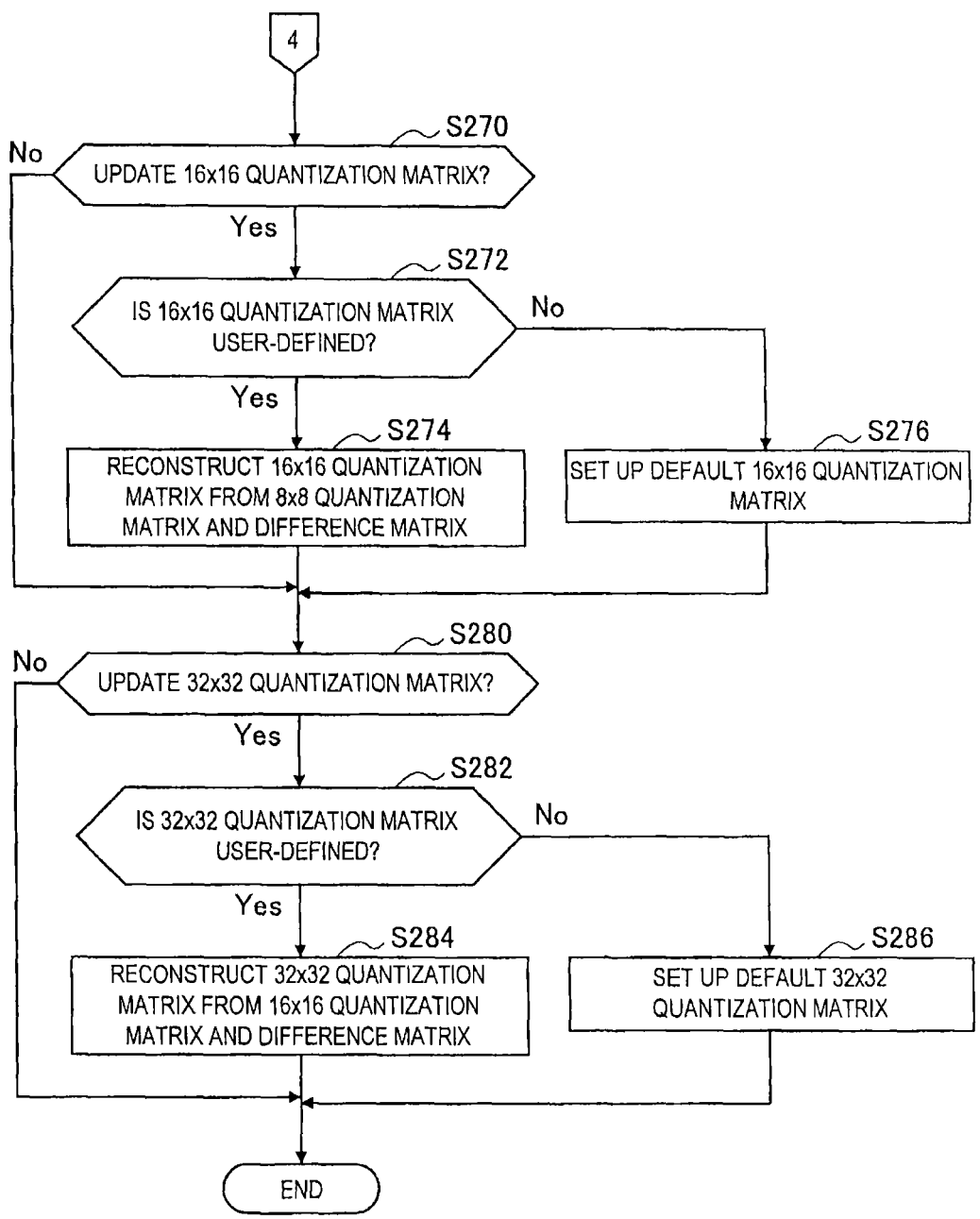
FIG. 12B is the latter half of a flowchart illustrating the second example of decoding process flow according to an embodiment.

FIGS. 12A and 12B are flowcharts illustrating a second example of decoding process flow according to the embodiment. The matrix generation section 210 can perform the process represented by the flowcharts mainly on each picture for an encoded stream.

With reference to FIG. 12A, the matrix generation section 210 checks the update flag contained in a picture parameter set to determine whether a 4×4 quantization matrix is updated in the picture (step S250). If a 4×4 quantization matrix is not updated, the process skips steps S252 through S256. If a 4×4 quantization matrix is updated, the matrix generation section 210 checks the matrix type flag to determine whether the new 4×4 quantization matrix is a user-defined one (step S252). If the 4×4 quantization matrix is a user-defined one, the matrix generation section 210 sets up the 4×4 quantization matrix using the basic matrix information (step S254). If the 4×4 quantization matrix is a default one, the matrix generation section 210 sets up the default 4×4 quantization matrix (step S256).

The matrix generation section 210 checks the update flag to determine whether an 8×8 quantization matrix is updated in the picture (step S260). If an 8×8 quantization matrix is not updated, the process skips steps S262 through S266. If an 8×8 quantization matrix is updated, the matrix generation section 210 checks the matrix type flag to determine whether the new 8×8 quantization matrix is a user-defined one (step S262). If the 8×8 quantization matrix is a user-defined one, the matrix generation section 210 calculates an 8×8 predicted matrix from the 4×4 quantization matrix for a new picture regardless of whether the 4×4 quantization matrix is updated. The matrix generation section 210 then adds the calculated predicted matrix to an 8×8 difference matrix. As a result, the 8×8 quantization matrix is reconstructed (step S264). If the 8×8 difference flag is set to 0, the difference matrix is null. The 8×8 predicted matrix may be directly set up as a quantization matrix. If the 8×8 quantization matrix is a default one, the matrix generation section 210 sets up the default 8×8 quantization matrix (step S266).

With reference to FIG. 12B, the matrix generation section 210 checks the update flag to determine whether a 16×16 quantization matrix is updated in the picture (step S270). If a 16×16 quantization matrix is not updated, the process skips steps S272 through S276. If a 16×16 quantization matrix is updated, the matrix generation section 210 checks the matrix type flag to determine whether the new 16×16 quantization matrix is a user-defined one (step S272). If the 16×16 quantization matrix is a user-defined one, the matrix generation section 210 calculates a 16×16 predicted matrix from the 8×8 quantization matrix for a new picture regardless of whether the 8×8 quantization matrix is updated. The matrix generation section 210 then adds the calculated predicted matrix to a 16×16 difference matrix. As a result, the 16×16 quantization matrix is reconstructed (step S274). If the 16×16 difference flag is set to 0, the difference matrix is null. The 16×16 predicted matrix is directly set up as a quantization matrix. If the 16×16 quantization matrix is a default one, the matrix generation section 210 sets up the default 16×16 quantization matrix (step S276).

The matrix generation section 210 checks the update flag to determine whether a 32×32 quantization matrix is updated in the picture (step S280). If a 32×32 quantization matrix is not updated, the process skips steps S282 through S286. If a 32×32 quantization matrix is updated, the matrix generation section 210 checks the matrix type flag to determine whether the new 32×32 quantization matrix is a user-defined one (step S282). If the 32×32 quantization matrix is a user-defined one, the matrix generation section 210 calculates a 32×32 predicted matrix from the 16×16 quantization matrix for a new picture regardless of whether the 16×16 quantization matrix is updated. The matrix generation section 210 then adds the calculated predicted matrix to a 32×32 difference matrix. As a result, the 32×32 quantization matrix is reconstructed (step S284). If the 32×32 difference flag is set to 0, the difference matrix is null. The 32×32 predicted matrix is directly set up as a quantization matrix. If the 32×32 quantization matrix is a default one, the matrix generation section 210 sets up the default 32×32 quantization matrix (step S286).

The decoding side can appropriately reconstruct quantization matrices using the technique to predict quantization matrices based on one quantization matrix even if the encoding side transmits, to the decoding side, only the difference information about a quantization matrix to be predicted. An increase in the code amount can be effectively suppressed even if the number of quantization matrices increases.

The specification has described the example of setting up only one type of quantization matrix for one transform unit size. While not limited thereto, multiple types of quantization matrices may be set up for one transform unit size. In such a case, the sequence parameter set and the picture parameter set may contain an additional flag indicating which of multiple types of quantization matrices needs to be used as a base to predict a quantization matrix of a larger size. It may be preferable to set up multiple types of quantization matrices for one transform unit size and selectively one quantization matrix to another for each slice or block within a picture.

<5. Modifications>

As described above, the technology disclosed in this specification may be embodied by predicting a quantization matrix of a smaller size from a quantization matrix of a larger size. For example, 8×8 quantization matrix SL2 is defined as follows.

[Math. 7]

$$SL2 = \begin{pmatrix} b_{00} & b_{10} & b_{20} & b_{30} & b_{40} & b_{50} & b_{60} & b_{70} \\ b_{01} & b_{11} & b_{21} & b_{31} & b_{41} & b_{51} & b_{61} & b_{71} \\ b_{02} & b_{12} & b_{22} & b_{32} & b_{42} & b_{52} & b_{62} & b_{72} \\ b_{03} & b_{13} & b_{23} & b_{33} & b_{43} & b_{53} & b_{63} & b_{73} \\ b_{04} & b_{14} & b_{24} & b_{34} & b_{44} & b_{54} & b_{64} & b_{74} \\ b_{05} & b_{15} & b_{25} & b_{35} & b_{45} & b_{55} & b_{65} & b_{75} \\ b_{06} & b_{16} & b_{26} & b_{36} & b_{46} & b_{56} & b_{66} & b_{76} \\ b_{07} & b_{17} & b_{27} & b_{37} & b_{47} & b_{57} & b_{67} & b_{77} \end{pmatrix} \quad (11)$$

For example, the prediction section 152 of the orthogonal transformation and quantization section 14 of the image encoding device 10 calculate 4×4 predicted matrix PSL1 from quantization matrix SL2 according to prediction expression (12) as follows.

[Math. 8]

$$PSL1 = \begin{pmatrix} b_{00} & b_{20} & b_{40} & b_{60} \\ b_{02} & b_{22} & b_{42} & b_{62} \\ b_{04} & b_{24} & b_{44} & b_{64} \\ b_{06} & b_{26} & b_{46} & b_{66} \end{pmatrix} \quad (12)$$

With reference to prediction expression (12), predicted matrix PSL1 is generated by thinning elements of quantization matrix SL2 every other row and column. Elements to be thinned may be positioned otherwise than the example of prediction expression (12). Increasing the number of elements to be thinned can cause a quantization matrix to generate a predicted matrix having sides each of which is one quarter or smaller.

Instead, predicted matrix PSL1 may be calculated from quantization matrix SL2 according to prediction expression (13) below.

[Math. 9]

$$PSL1 = \begin{pmatrix} \frac{b_{00}+b_{01}+b_{10}+b_{11}}{4} & \frac{b_{20}+b_{21}+b_{30}+b_{31}}{4} & \frac{b_{40}+b_{41}+b_{50}+b_{51}}{4} & \frac{b_{60}+b_{61}+b_{70}+b_{71}}{4} \\ \frac{b_{02}+b_{03}+b_{12}+b_{13}}{4} & \frac{b_{22}+b_{23}+b_{32}+b_{33}}{4} & \frac{b_{42}+b_{43}+b_{52}+b_{53}}{4} & \frac{b_{62}+b_{63}+b_{72}+b_{73}}{4} \\ \frac{b_{04}+b_{05}+b_{14}+b_{15}}{4} & \frac{b_{24}+b_{25}+b_{34}+b_{35}}{4} & \frac{b_{44}+b_{45}+b_{54}+b_{55}}{4} & \frac{b_{64}+b_{65}+b_{74}+b_{75}}{4} \\ \frac{b_{06}+b_{07}+b_{16}+b_{17}}{4} & \frac{b_{26}+b_{27}+b_{36}+b_{37}}{4} & \frac{b_{46}+b_{47}+b_{56}+b_{57}}{4} & \frac{b_{66}+b_{67}+b_{76}+b_{77}}{4} \end{pmatrix} \quad (13)$$

With reference to prediction expression (13), predicted matrix PSL1 is generated by calculating an average of four elements vertically and horizontally adjacent to each other in quantization matrix SL2 as one element of predicted matrix PSL1. Averaging more elements (e.g., 16 elements) vertically and horizontally adjacent to each other can cause a quantization matrix to generate a predicted matrix having sides each of which is one quarter or smaller. Instead of the average used in prediction expression (13), the other representative values such as the center value, the minimum value, and the maximum value may be calculated from elements.

A predicted matrix of a smaller size may be calculated from a quantization matrix of a larger size. Also in such a case, the difference calculation section 154 calculates a difference matrix representing a difference between the predicted matrix supplied from the prediction section 152 and the corresponding quantization matrix and supplies the lossless encoding section 16 with difference matrix information representing the calculated difference matrix. The matrix generation section 210 of the inverse quantization and inverse orthogonal transformation section 63 of the image decoding device 60 generates a quantization matrix having a smaller size from the quantization matrix specified in the basic matrix information using any of the above-described prediction expressions and the difference matrix information.

Figure 13A:
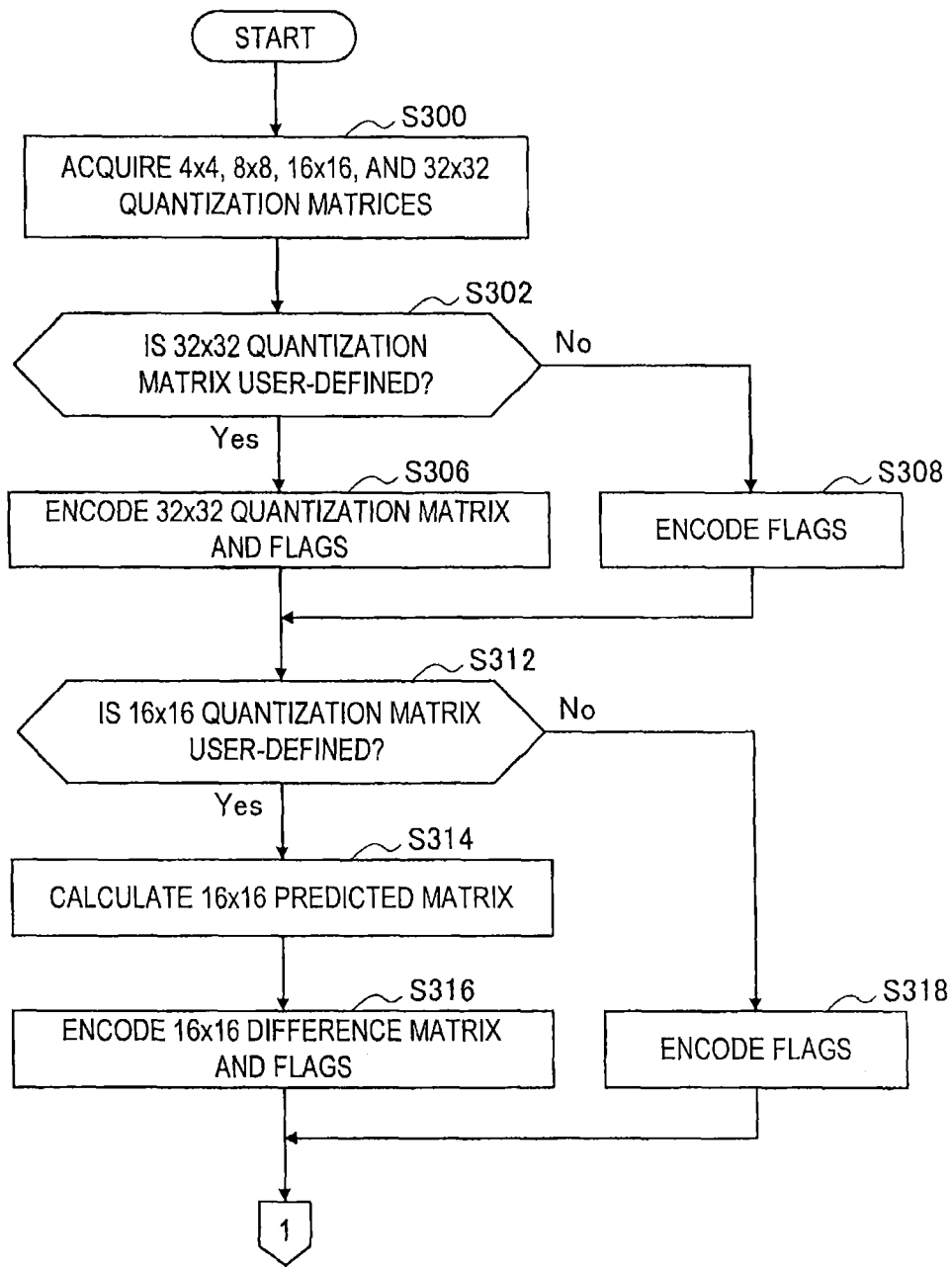
FIG. 13A is the first half of a flowchart illustrating an example of encoding process flow according to one modification.
Figure 13B:
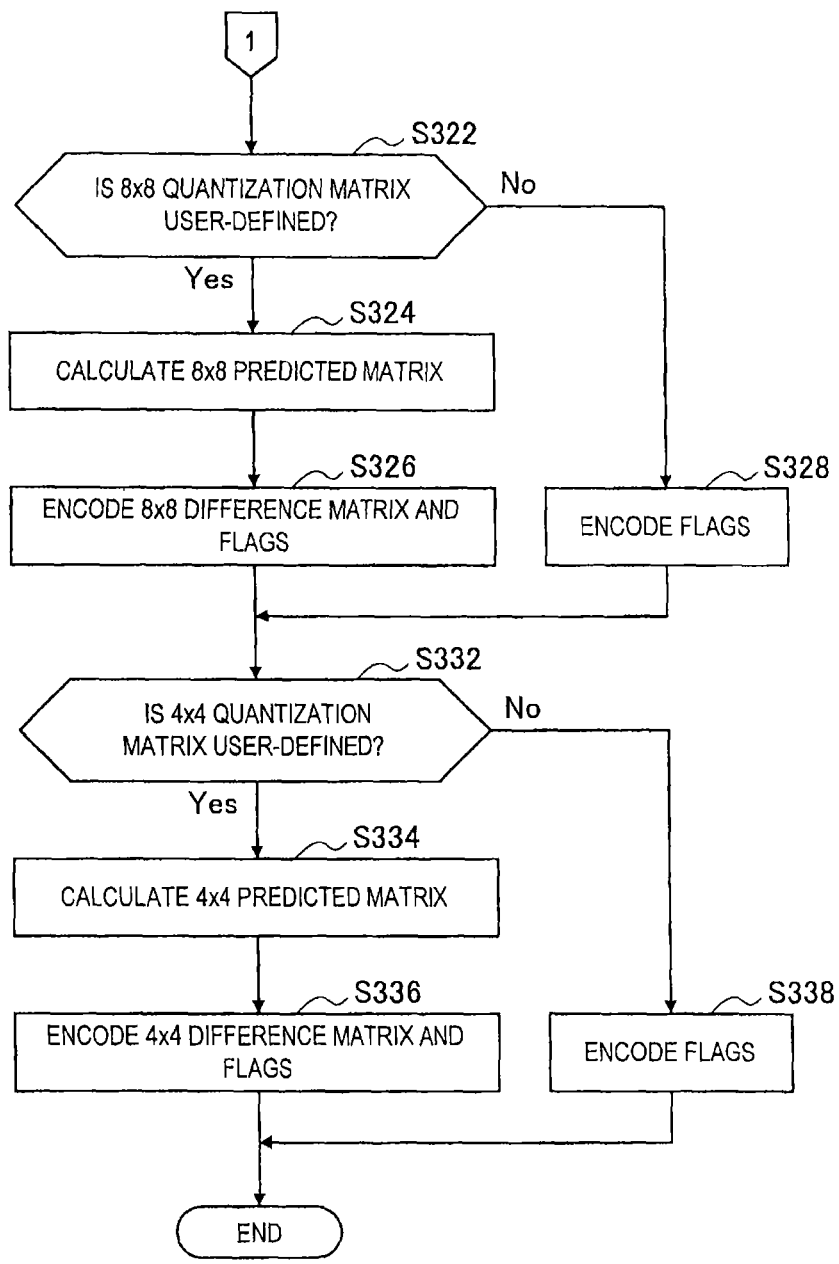
FIG. 13B is the latter half of a flowchart illustrating the example of encoding process flow according to one modification.

FIGS. 13A and 13B are flowcharts illustrating an example of encoding process flow according to one modification. The matrix processing section 150 and the lossless encoding section 16 can perform the process represented by the flowcharts mainly on each encoded stream sequence.

With reference to FIG. 13A, the matrix processing section 150 acquires a set of quantization matrices used for the quantization section 130 in this sequence from the quantization matrix buffer 140 (step S300). As an example, the set of quantization matrices is assumed to contain quantization matrices corresponding to the sizes of 4×4, 8×8, 16×16, and 32×32.

The matrix processing section 150 determines whether a 32×32 quantization matrix is a user-defined one (step S302). If the 32×32 quantization matrix is a user-defined one, the lossless encoding section 16 encodes the basic matrix information that represents a 32×32 quantization matrix with the matrix type flag set to 1 (step S306). If the 32×32 quantization matrix is a default one, the lossless encoding section 16 encodes only the matrix type flag set to 0 (step S308).

The matrix processing section 150 determines whether a 16×16 quantization matrix is a user-defined one (step S312). If the 16×16 quantization matrix is a user-defined one, the matrix processing section 150 calculates a 16×16 predicted matrix from the 32×32 quantization matrix according to prediction expression (12) or (13) described above (step S314). The lossless encoding section 16 encodes the matrix type flag (=1), the difference flag, and the difference matrix information (if any) indicating a difference between the 16×16 quantization matrix and the calculated predicted matrix (step S316). If the 16×16 quantization matrix is a default one, the lossless encoding section 16 encodes only the matrix type flag set to 0 (step S318).

With reference to FIG. 13B, the matrix processing section 150 determines whether an 8×8 quantization matrix is a user-defined one (step S322). If the 8×8 quantization matrix is a user-defined one, the matrix processing section 150 calculates an 8×8 predicted matrix from the 16×16 quantization matrix (step S324). The lossless encoding section 16 encodes the matrix type flag (=1), the difference flag, and the difference matrix information (if any) indicating a difference between the 8×8 quantization matrix and the calculated predicted matrix (step S326). If the 8×8 quantization matrix is a default one, the lossless encoding section 16 encodes only the matrix type flag set to 0 (step S328).

The matrix processing section 150 determines whether a 4×4 quantization matrix is a user-defined one (step S332). If the 4×4 quantization matrix is a user-defined one, the matrix processing section 150 calculates a 4×4 predicted matrix from the 8×8 quantization matrix (step S334). The lossless encoding section 16 encodes the matrix type flag (=1), the difference flag, and the difference matrix information (if any) indicating a difference between the 4×4 quantization matrix and the calculated predicted matrix (step S336). If the 4×4 quantization matrix is a default one, the lossless encoding section 16 encodes only the matrix type flag set to 0 (step S338).

If the SPS is used to define quantization matrices, the modification may calculate and encode predicted matrices in descending order of quantization matrix sizes. If the PPS is used to update quantization matrices, the modification may also calculate and encode predicted matrices in descending order of quantization matrix sizes.

Figure 14A:
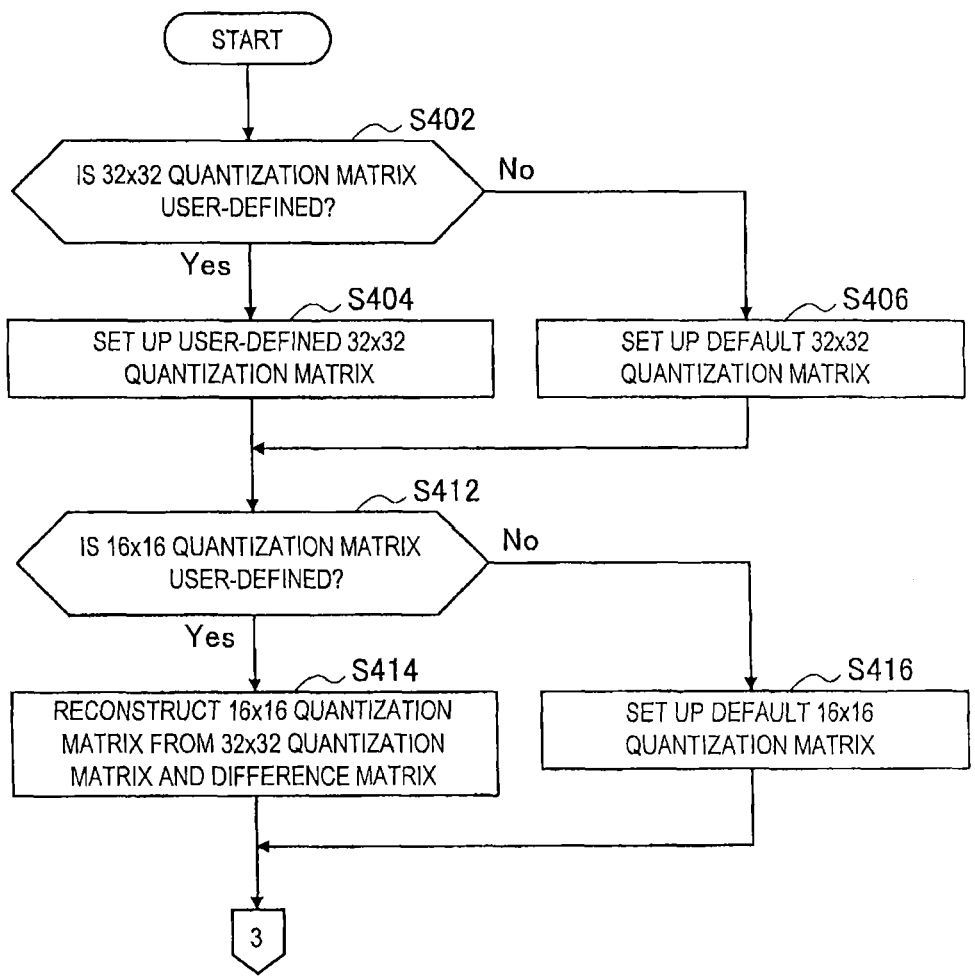
FIG. 14A is the first half of a flowchart illustrating an example of decoding process flow according to one modification.
Figure 14B:
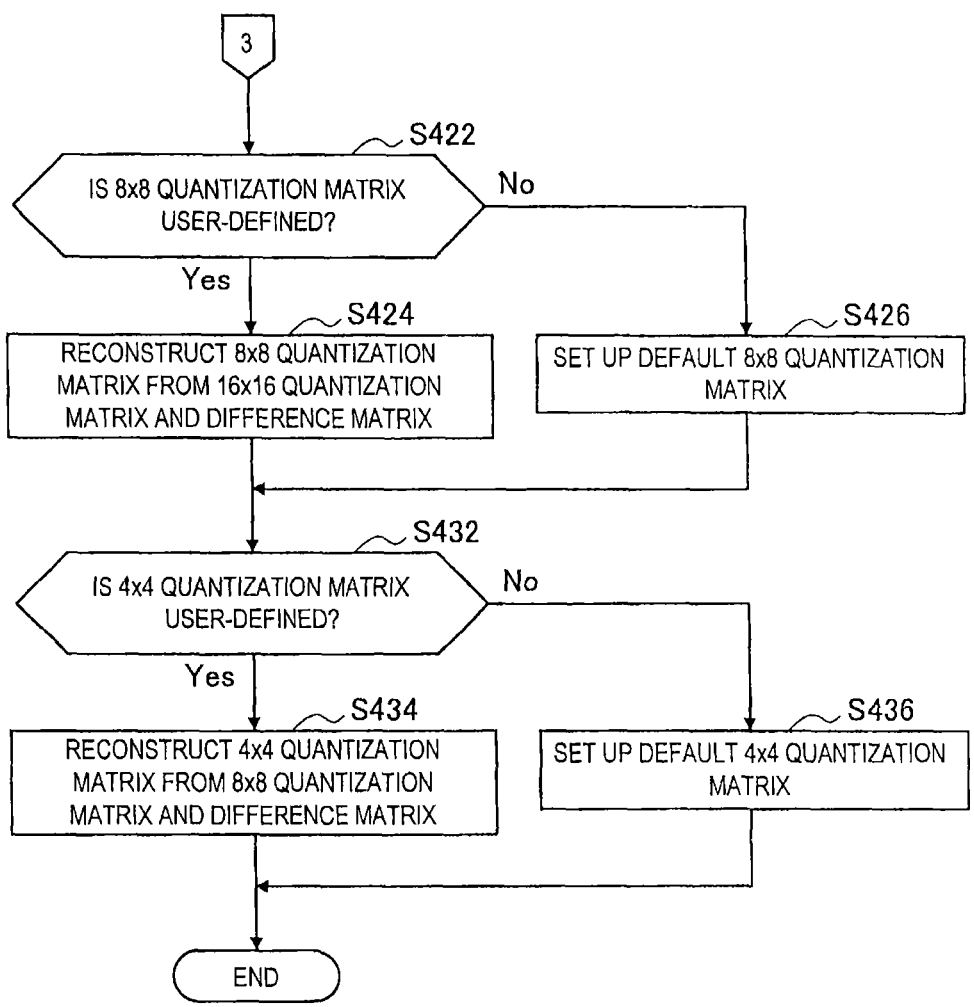
FIG. 14B is the first half of a flowchart illustrating the example of decoding process flow according to one modification.

FIGS. 14A and 14B are flowcharts illustrating an example of decoding process flow according to the embodiment. The matrix generation section 210 can perform the process represented by the flowcharts mainly on each encoded stream sequence.

With reference to FIG. 14A, the matrix generation section 210 checks the matrix type flag contained in the sequence parameter set of the sequence to determine whether the 32×32 quantization matrix is a user-defined one (step S402). If the 32×32 quantization matrix is a user-defined one, the matrix generation section 210 uses the basic matrix information to set up the 32×32 quantization matrix, namely, store the same in the quantization matrix buffer 220 (step S404). If the 32×32 quantization matrix is a default one, the matrix generation section 210 sets up the default 32×32 quantization matrix (step S406).

The matrix generation section 210 determines whether a 16×16 quantization matrix is a user-defined one (step S412). If the 16×16 quantization matrix is a user-defined one, the matrix generation section 210 uses the above-described prediction expression (12) or (13) to calculate a 16×16 predicted matrix from the 32×32 quantization matrix and adds the calculated predicted matrix to a 16×16 difference matrix. As a result, the 16×16 quantization matrix is reconstructed (step S414). If the 16×16 difference flag is set to 0, the difference matrix is null. The 16×16 predicted matrix is directly set up as a quantization matrix. If the 16×16 quantization matrix is a default one, the matrix generation section 210 sets up the default 16×16 quantization matrix (step S416).

With reference to FIG. 14B, the matrix generation section 210 determines whether an 8×8 quantization matrix is a user-defined one (step S422). If the 8×8 quantization matrix is a user-defined one, the matrix generation section 210 calculates an 8×8 predicted matrix from the 16×16 quantization matrix and adds the calculated predicted matrix to an 8×8 difference matrix. As a result, the 8×8 quantization matrix is reconstructed (step S424). If the 8×8 difference flag is set to 0, the difference matrix is null. The 8×8 predicted matrix may be directly set up as a quantization matrix. If the 8×8 quantization matrix is a default one, the matrix generation section 210 sets up the default 8×8 quantization matrix (step S426).

The matrix generation section 210 determines whether a 4×4 quantization matrix is a user-defined one (step S432). If the 4×4 quantization matrix is a user-defined one, the matrix generation section 210 calculates a 4×4 predicted matrix from the 8×8 quantization matrix and adds the calculated predicted matrix to a 4×4 difference matrix. As a result, the 4×4 quantization matrix is reconstructed (step S434). If the 4×4 difference flag is set to 0, the difference matrix is null. The 4×4 predicted matrix may be directly set up as a quantization matrix. If the 4×4 quantization matrix is a default one, the matrix generation section 210 sets up the default 4×4 quantization matrix (step S436).

If the SPS is used to decode quantization matrices, the modification may reconstruct quantization matrices in descending order of quantization matrix sizes. If the PPS is used to update quantization matrices, the modification may also reconstruct quantization matrices in descending order of quantization matrix sizes.

<6. Example Applications>

The image encoding device 10 and the image decoding device 60 according to the embodiment described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

6-1. First Example Application

Figure 15:
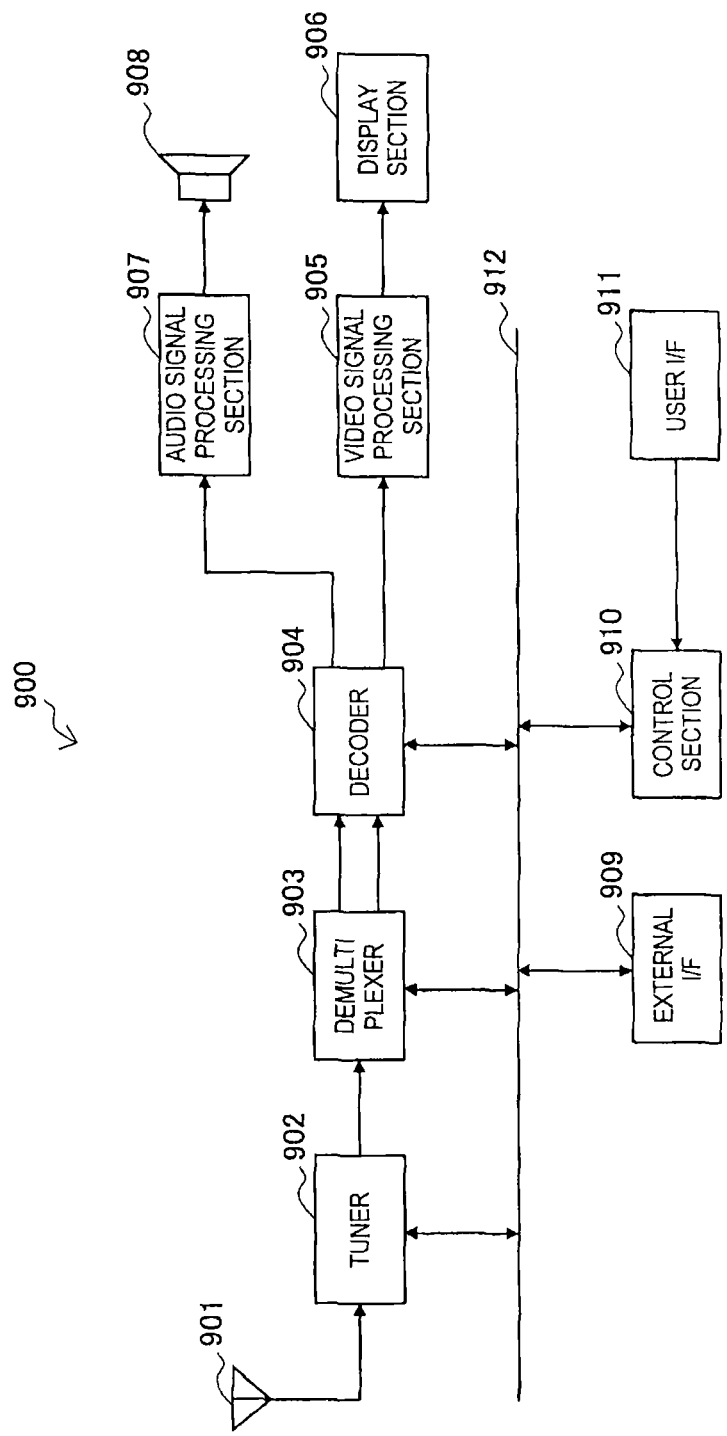
FIG. 15 is a block diagram illustrating a schematic configuration of a television apparatus.

FIG. 15 is a block diagram showing an example of a schematic configuration of a television adopting the embodiment described above. A television 900 includes an antenna 901, a tuner 902, a demultiplexer 903, a decoder 904, an video signal processing section 905, a display section 906, an audio signal processing section 907, a speaker 908, an external interface 909, a control section 910, a user interface 911, and a bus 912.

The tuner 902 extracts a signal of a desired channel from broadcast signals received via the antenna 901, and demodulates the extracted signal. Then, the tuner 902 outputs an encoded bit stream obtained by demodulation to the demultiplexer 903. That is, the tuner 902 serves as transmission means of the televisions 900 for receiving an encoded stream in which an image is encoded.

The demultiplexer 903 separates a video stream and an audio stream of a program to be viewed from the encoded bit stream, and outputs each stream which has been separated to the decoder 904. Also, the demultiplexer 903 extracts auxiliary data such as an EPG (Electronic Program Guide) from the encoded bit stream, and supplies the extracted data to the control section 910. Additionally, the demultiplexer 903 may perform descrambling in the case the encoded bit stream is scrambled.

The decoder 904 decodes the video stream and the audio stream input from the demultiplexer 903. Then, the decoder 904 outputs video data generated by the decoding process to the video signal processing section 905. Also, the decoder 904 outputs the audio data generated by the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data according to the setting. Furthermore, the video signal processing section 905 may generate an image of a GUI (Graphical User Interface) such as a menu, a button, a cursor or the like, for example, and superimpose the generated image on an output image.

The display section 906 is driven by a drive signal supplied by the video signal processing section 905, and displays a video or an image on an video screen of a display device (for example, a liquid crystal display, a plasma display, an OLED, or the like).

The audio signal processing section 907 performs reproduction processes such as D/A conversion and amplification on the audio data input from the decoder 904, and outputs audio from the speaker 908. Also, the audio signal processing section 907 may perform an additional process such as noise removal on the audio data.

The external interface 909 is an interface for connecting the television 900 and an external appliance or a network. For example, a video stream or an audio stream received via the external interface 909 may be decoded by the decoder 904. That is, the external interface 909 also serves as transmission means of the televisions 900 for receiving an encoded stream in which an image is encoded.

The control section 910 includes a processor such as a CPU (Central Processing Unit), and a memory such as an RAM (Random Access Memory), an ROM (Read Only Memory), or the like. The memory stores a program to be executed by the CPU, program data, EPG data, data acquired via a network, and the like. The program stored in the memory is read and executed by the CPU at the time of activation of the television 900, for example. The CPU controls the operation of the television 900 according to an operation signal input from the user interface 911, for example, by executing the program.

The user interface 911 is connected to the control section 910. The user interface 911 includes a button and a switch used by a user to operate the television 900, and a receiving section for a remote control signal, for example. The user interface 911 detects an operation of a user via these structural elements, generates an operation signal, and outputs the generated operation signal to the control section 910.

The bus 912 interconnects the tuner 902, the demultiplexer 903, the decoder 904, the video signal processing section 905, the audio signal processing section 907, the external interface 909, and the control section 910.

In the television 900 configured in this manner, the decoder 904 has a function of the image decoding device 60 according to the embodiment described above. Accordingly, also in the case of the image decoding in the television 900, it is possible to suppress in an increase in the code amount due to an increase in the number of quantization matrices.

6-2. Second Example Application

Figure 16:
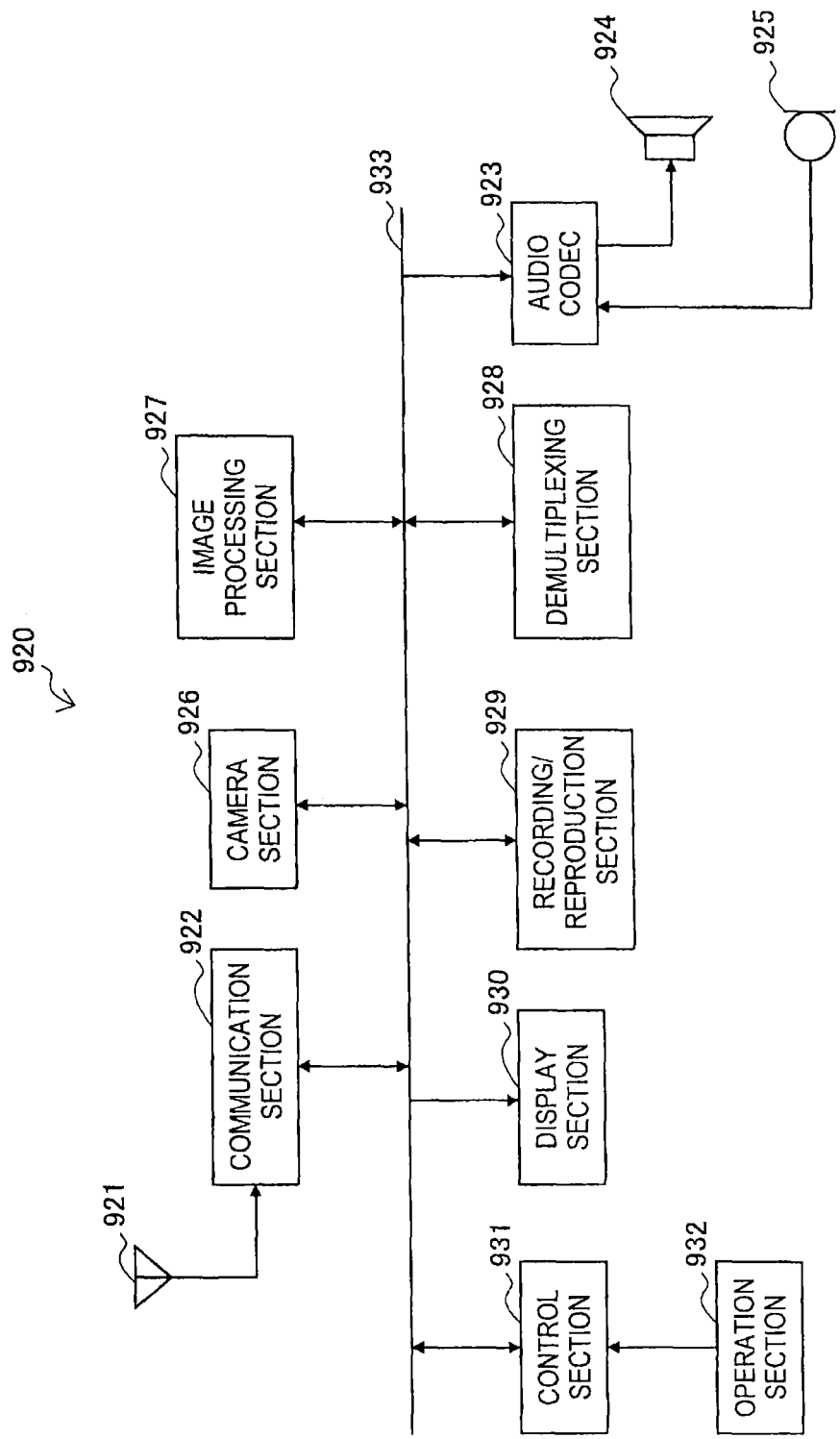
FIG. 16 is a block diagram illustrating a schematic configuration of a mobile phone.

FIG. 16 is a block diagram showing an example of a schematic configuration of a mobile phone adopting the embodiment described above. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 interconnects the communication section 922, the audio codec 923, the camera section 926, the image processing section 927, the demultiplexing section 928, the recording/reproduction section 929, the display section 930, and the control section 931.

The mobile phone 920 performs operation such as transmission/reception of audio signal, transmission/reception of emails or image data, image capturing, recording of data, and the like, in various operation modes including an audio communication mode, a data communication mode, an image capturing mode, and a videophone mode.

In the audio communication mode, an analogue audio signal generated by the microphone 925 is supplied to the audio codec 923. The audio codec 923 converts the analogue audio signal into audio data, and A/D converts and compresses the converted audio data. Then, the audio codec 923 outputs the compressed audio data to the communication section 922. The communication section 922 encodes and modulates the audio data, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 extends and D/A converts the audio data, and generates an analogue audio signal. Then, the audio codec 923 supplies the generated audio signal to the speaker 924 and causes the audio to be output.

Also, in the data communication mode, the control section 931 generates text data that makes up an email, according to an operation of a user via the operation section 932, for example. Moreover, the control section 931 causes the text to be displayed on the display section 930. Furthermore, the control section 931 generates email data according to a transmission instruction of the user via the operation section 932, and outputs the generated email data to the communication section 922. Then, the communication section 922 encodes and modulates the email data, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. Then, the communication section 922 demodulates and decodes the received signal, restores the email data, and outputs the restored email data to the control section 931. The control section 931 causes the display section 930 to display the contents of the email, and also, causes the email data to be stored in the storage medium of the recording/reproduction section 929.

The recording/reproduction section 929 includes an arbitrary readable and writable storage medium. For example, the storage medium may be a built-in storage medium such as an RAM, a flash memory or the like, or an externally mounted storage medium such as a hard disk, a magnetic disk, a magneto-optical disk, an optical disc, an USB memory, a memory card, or the like.

Furthermore, in the image capturing mode, the camera section 926 captures an image of a subject, generates image data, and outputs the generated image data to the image processing section 927, for example. The image processing section 927 encodes the image data input from the camera section 926, and causes the encoded stream to be stored in the storage medium of the recording/reproduction section 929.

Furthermore, in the videophone mode, the demultiplexing section 928 multiplexes a video stream encoded by the image processing section 927 and an audio stream input from the audio codec 923, and outputs the multiplexed stream to the communication section 922, for example. The communication section 922 encodes and modulates the stream, and generates a transmission signal. Then, the communication section 922 transmits the generated transmission signal to a base station (not shown) via the antenna 921. Also, the communication section 922 amplifies a wireless signal received via the antenna 921 and converts the frequency of the wireless signal, and acquires a received signal. These transmission signal and received signal may include an encoded bit stream. Then, the communication section 922 demodulates and decodes the received signal, restores the stream, and outputs the restored stream to the demultiplexing section 928. The demultiplexing section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends and D/A converts the audio stream, and generates an analogue audio signal. Then, the audio codec 923 supplies the generated audio signal to the speaker 924 and causes the audio to be output.

In the mobile phone 920 configured in this manner, the image processing section 927 has a function of the image encoding device 10 and the image decoding device 60 according to the embodiment described above. Accordingly, also in the case of the image decoding and encoding in the mobile phone 920, it is possible to suppress in an increase in the code amount due to an increase in the number of quantization matrices.

6-3. Third Example Application

Figure 17:
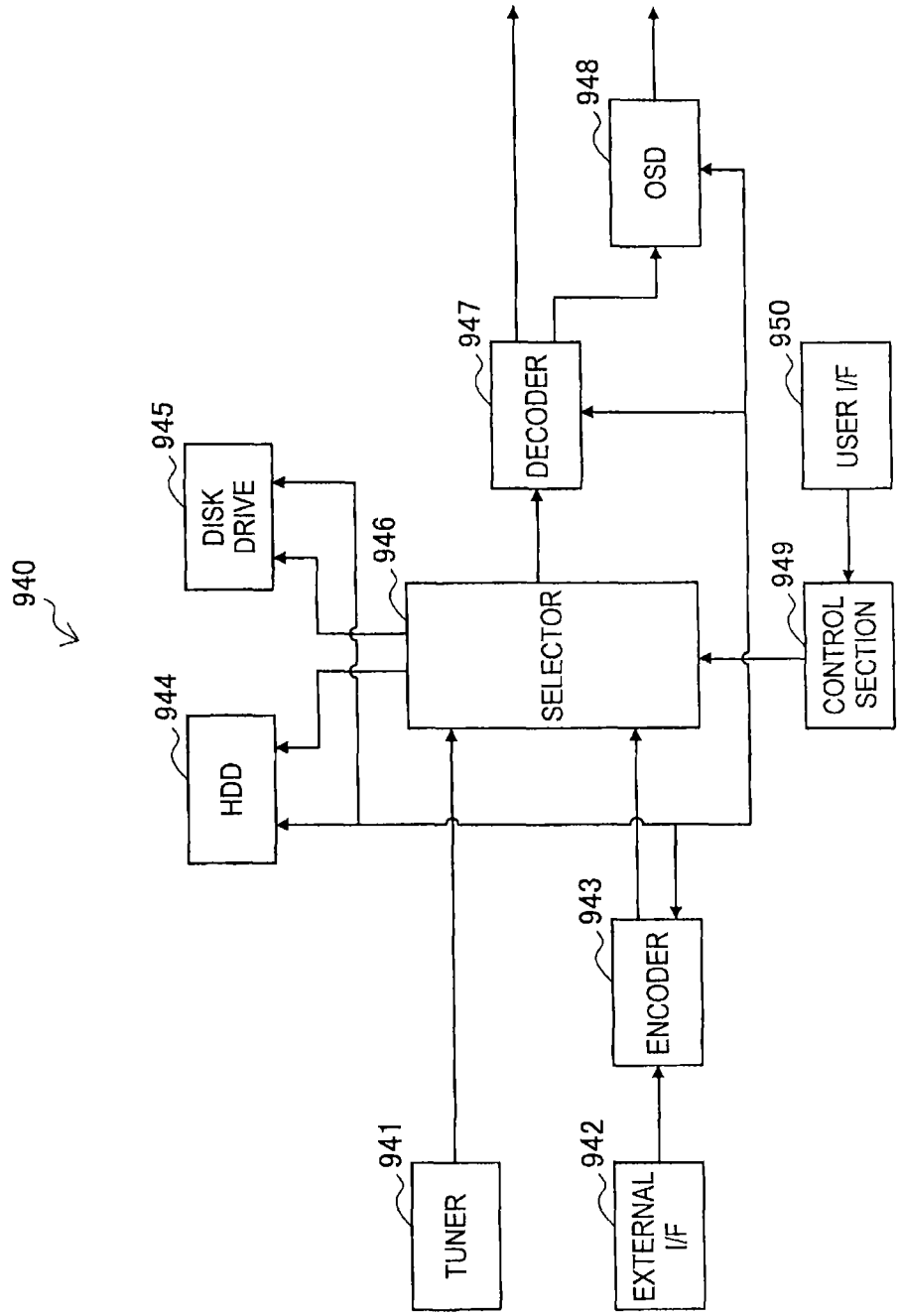
FIG. 17 is a block diagram illustrating a schematic configuration of a recording/reproduction device.

FIG. 17 is a block diagram showing an example of a schematic configuration of a recording/reproduction device adopting the embodiment described above. A recording/reproduction device 940 encodes, and records in a recording medium, audio data and video data of a received broadcast program, for example. The recording/reproduction device 940 may also encode, and record in the recording medium, audio data and video data acquired from another device, for example. Furthermore, the recording/reproduction device 940 reproduces, using a monitor or a speaker, data recorded in the recording medium, according to an instruction of a user, for example. At this time, the recording/reproduction device 940 decodes the audio data and the video data.

The recording/reproduction device 940 includes a tuner 941, an external interface 942, an encoder 943, an HDD (Hard Disk Drive) 944, a disc drive 945, a selector 946, a decoder 947, an OSD (On-Screen Display) 948, a control section 949, and a user interface 950.

The tuner 941 extracts a signal of a desired channel from broadcast signals received via an antenna (not shown), and demodulates the extracted signal. Then, the tuner 941 outputs an encoded bit stream obtained by demodulation to the selector 946. That is, the tuner 941 serves as transmission means of the recording/reproduction device 940.

The external interface 942 is an interface for connecting the recording/reproduction device 940 and an external appliance or a network. For example, the external interface 942 may be an IEEE 1394 interface, a network interface, an USB interface, a flash memory interface, or the like. For example, video data and audio data received by the external interface 942 are input to the encoder 943. That is, the external interface 942 serves as transmission means of the recording/reproduction device 940.

In the case the video data and the audio data input from the external interface 942 are not encoded, the encoder 943 encodes the video data and the audio data. Then, the encoder 943 outputs the encoded bit stream to the selector 946.

The HDD 944 records in an internal hard disk an encoded bit stream, which is compressed content data of a video or audio, various programs, and other pieces of data. Also, the HDD 944 reads these pieces of data from the hard disk at the time of reproducing a video or audio.

The disc drive 945 records or reads data in a recording medium that is mounted. A recording medium that is mounted on the disc drive 945 may be a DVD disc (a DVD-Video, a DVD-RAM, a DVD-R, a DVD-RW, a DVD+, a DVD+RW, or the like), a Blu-ray (registered trademark) disc, or the like, for example.

The selector 946 selects, at the time of recording a video or audio, an encoded bit stream input from the tuner 941 or the encoder 943, and outputs the selected encoded bit stream to the HDD 944 or the disc drive 945. Also, the selector 946 outputs, at the time of reproducing a video or audio, an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 reproduces the video data input from the decoder 947, and displays a video. Also, the OSD 948 may superimpose an image of a GUI, such as a menu, a button, a cursor or the like, for example, on a displayed video.

The control section 949 includes a processor such as a CPU, and a memory such as an RAM or an ROM. The memory stores a program to be executed by the CPU, program data, and the like. A program stored in the memory is read and executed by the CPU at the time of activation of the recording/reproduction device 940, for example. The CPU controls the operation of the recording/reproduction device 940 according to an operation signal input from the user interface 950, for example, by executing the program.

The user interface 950 is connected to the control section 949. The user interface 950 includes a button and a switch used by a user to operate the recording/reproduction device 940, and a receiving section for a remote control signal, for example. The user interface 950 detects an operation of a user via these structural elements, generates an operation signal, and outputs the generated operation signal to the control section 949.

In the recording/reproduction device 940 configured in this manner, the encoder 943 has a function of the image encoding device 10 according to the embodiment described above. Also, the decoder 947 has a function of the image decoding device 60 according to the embodiment described above. Accordingly, also in the case of the image decoding and encoding in the recording/reproduction device 940, it is possible to suppress in an increase in the code amount due to an increase in the number of quantization matrices.

6-4. Fourth Example Application

Figure 18:
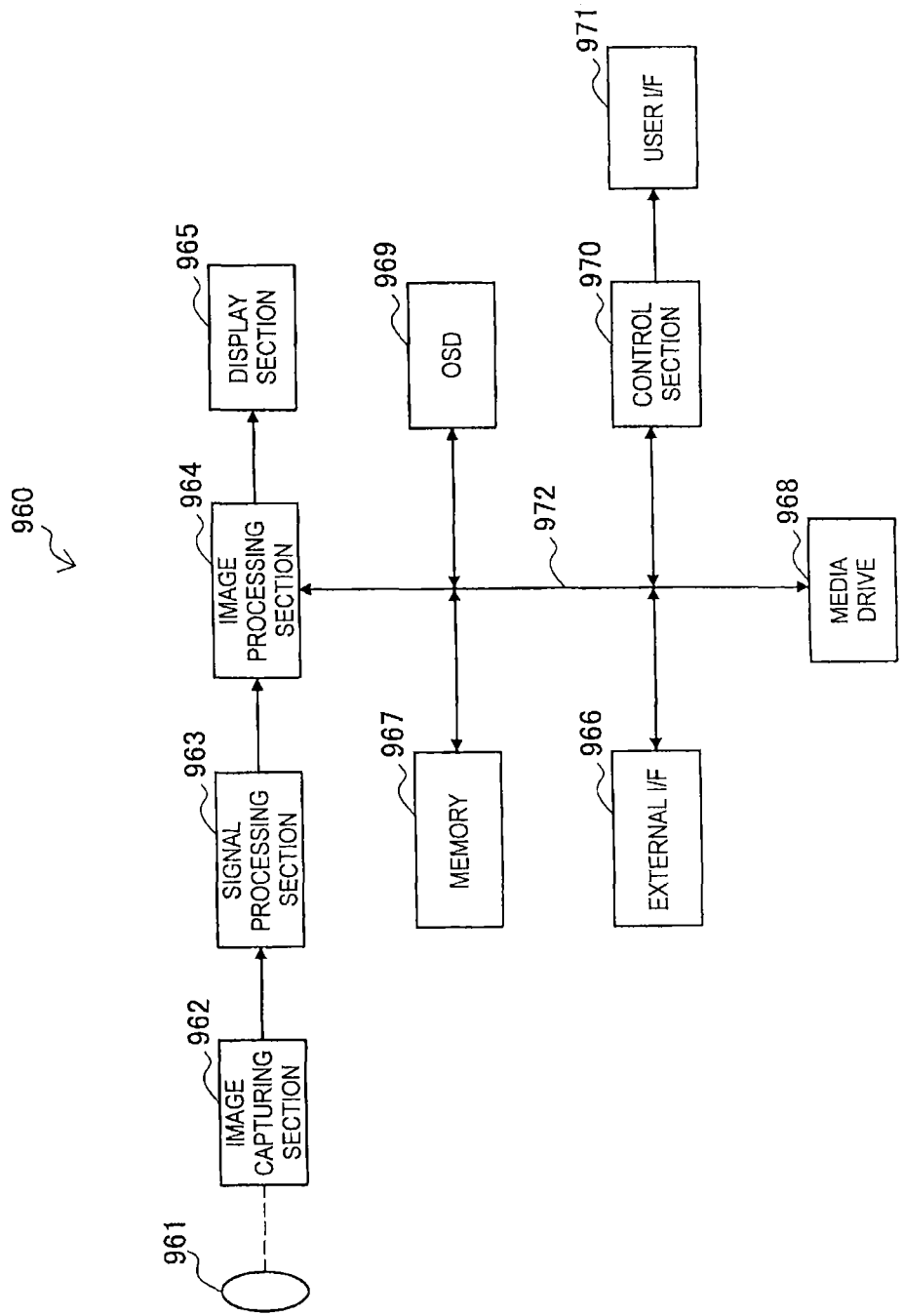
FIG. 18 is a block diagram illustrating a schematic configuration of an image capturing device.

FIG. 18 is a block diagram showing an example of a schematic configuration of an image capturing device adopting the embodiment described above. An image capturing device 960 captures an image of a subject, generates an image, encodes the image data, and records the image data in a recording medium.

The image capturing device 960 includes an optical block 961, an image capturing section 962, a signal processing section 963, an image processing section 964, a display section 965, an external interface 966, a memory 967, a media drive 968, an OSD 969, a control section 970, a user interface 971, and a bus 972.

The optical block 961 is connected to the image capturing section 962. The image capturing section 962 is connected to the signal processing section 963. The display section 965 is connected to the image processing section 964. The user interface 971 is connected to the control section 970. The bus 972 interconnects the image processing section 964, the external interface 966, the memory 967, the media drive 968, the OSD 969, and the control section 970.

The optical block 961 includes a focus lens, an aperture stop mechanism, and the like. The optical block 961 forms an optical image of a subject on an image capturing surface of the image capturing section 962. The image capturing section 962 includes an image sensor such as a CCD, a CMOS or the like, and converts by photoelectric conversion the optical image formed on the image capturing surface into an image signal which is an electrical signal. Then, the image capturing section 962 outputs the image signal to the signal processing section 963.

The signal processing section 963 performs various camera signal processes, such as knee correction, gamma correction, color correction and the like, on the image signal input from the image capturing section 962. The signal processing section 963 outputs the image data after the camera signal process to the image processing section 964.

The image processing section 964 encodes the image data input from the signal processing section 963, and generates encoded data. Then, the image processing section 964 outputs the generated encoded data to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI, such as a menu, a button, a cursor or the like, for example, and outputs the generated image to the image processing section 964.

The external interface 966 is configured as an USB input/output terminal, for example. The external interface 966 connects the image capturing device 960 and a printer at the time of printing an image, for example. Also, a drive is connected to the external interface 966 as necessary. A removable medium, such as a magnetic disk, an optical disc or the like, for example, is mounted on the drive, and a program read from the removable medium may be installed in the image capturing device 960. Furthermore, the external interface 966 may be configured as a network interface to be connected to a network such as a LAN, the Internet or the like. That is, the external interface 966 serves as transmission means of the image capturing device 960.

A recording medium to be mounted on the media drive 968 may be an arbitrary readable and writable removable medium, such as a magnetic disk, a magneto-optical disk, an optical disc, a semiconductor memory or the like, for example. Also, a recording medium may be fixedly mounted on the media drive 968, configuring a non-transportable storage section such as a built-in hard disk drive or an SSD (Solid State Drive), for example.

The control section 970 includes a processor such as a CPU, and a memory such as an RAM or an ROM. The memory stores a program to be executed by the CPU, program data, and the like. A program stored in the memory is read and executed by the CPU at the time of activation of the image capturing device 960, for example. The CPU controls the operation of the image capturing device 960 according to an operation signal input from the user interface 971, for example, by executing the program.

The user interface 971 is connected to the control section 970. The user interface 971 includes a button, a switch and the like used by a user to operate the image capturing device 960, for example. The user interface 971 detects an operation of a user via these structural elements, generates an operation signal, and outputs the generated operation signal to the control section 970.

In the image capturing device 960 configured in this manner, the image processing section 964 has a function of the image encoding device 10 and the image decoding device 60 according to the embodiment described above. Accordingly, in the case of the image decoding and encoding in the image capturing device 960, it is possible to suppress in an increase in the code amount due to an increase in the number of quantization matrices.

<7. Summing-Up>

There have been described the image encoding device 10 and the image decoding device 60 according to an embodiment with reference to FIGS. 1 through 18. The embodiment uses the prediction technique to generate a second quantization matrix corresponding to a transform unit representing a second size from a first quantization matrix corresponding to a transform unit representing a first size if multiple quantization matrices correspond to multiple transform units representing different sizes. This can eliminate the need to encode the whole of the second quantization matrix. An increase in the code amount can be effectively suppressed even if the number of quantization matrices increases.

The embodiment generates the second quantization matrix using the matrix information specifying the first quantization matrix and the difference information (difference matrix information) representing a difference between a predicted matrix and the second quantization matrix. Therefore, it is possible to acquire the second quantization matrix appropriate to the image decoding side simply by encoding only a difference between the second quantization matrix and a predicted matrix.

According to the embodiment, a first flag may indicate the absence of a difference between a predicted matrix and the second quantization matrix and may be acquired from the sequence parameter set or the picture parameter set. In such a case, a predicted matrix predicted from the second quantization matrix is assumed to be the second quantization matrix. In this case, the code amount can be further reduced because even difference information is not encoded for the second quantization matrix.

The first quantization matrix may have the minimum of transform unit sizes. The above-described configuration need not encode all the quantization matrices other than the quantization matrix having the minimum size. Therefore, an increase in the code amount can be more effectively suppressed even if the number of quantization matrices increases.

In this specification, it has been described how information for generating a quantization matrix is multiplexed in a header of an encoded stream and is transmitted from the encoding side to the decoding side. However, a technique of transmitting information used for transmitting such information is not limited to the technique described above. For example, the information may not be multiplexed into an encoded bit stream but may be transmitted or recorded as separate data associated with the encoded bit stream. The term "association" signifies ensuring possibility of linking an image (or part of an image such as a slice or a block) contained in the bit stream with information corresponding to the image. Namely, the information may be transmitted over a transmission path different from that used for images (or bit streams). The information may be recorded on a recording medium (or a different recording area on the same recording medium) different from that used for images (or bit streams). The information and the image (or bit stream) may be associated with each other based on any units such as multiple frames, one frame, or part of a frame.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Image processing device (image encoding device)
16 Encoding section
110 Selection section
120 Orthogonal transformation section
130 Quantization section
60 Image processing device (image decoding device)
210 Matrix generation section
230 Selection section
240 Inverse quantization section
250 Inverse orthogonal transformation section

The invention claimed is:

1. An image processing apparatus comprising:
circuitry configured to:
  select, from a plurality of transform units with different sizes, a 32×32transform unit used for orthogonal transformation of image data to be encoded; and
  quantize transform coefficient data generated by orthogonally transforming the image data based on the 32×32 transform unit by using a 32×32 quantization matrix based on an 8×8 quantization matrix,
wherein the circuitry is configured to generate the 32×32 quantization matrix b duplicating one of a first element and a second element adjacent to each other in the 8×8 quantization matrix as an element between the first element and the second element in the 32×32 quantization matrix.

2. The image processing apparatus according to claim 1, wherein the circuitry is configured to transform the image data to generate the transform coefficient data on the basis of the 32×32 transform unit.

3. The image processing apparatus according to claim 2, wherein the circuitry is configured to encode the quantized transform coefficient data to generate an encoded stream.

4. The image processing apparatus according to claim 3, wherein the circuitry is configured to capture an image and generate the image data from the image.

5. The image processing apparatus according to claim 4, wherein the circuitry is configured to store the encoded stream.

6. The image processing apparatus according to claim 4, wherein the circuitry is configured multiplex the encoded stream with an audio stream to generate a multiplex stream.

7. The image processing apparatus according to claim 6, wherein the circuitry is configured to:
generate a transmission signal by encoding and modulating the multiplex stream; and
transmit the transmission signal.

8. An image processing method comprising:
selecting, by circuitry of an image processing apparatus and from a plurality of transform units with different sizes, a 32×32 transform unit used for orthogonal transformation of image data to be encoded; and
quantizing, by the circuitry, transform coefficient data generated by orthogonally transforming the image data based on the 32×32 transform unit by using a 32×32 quantization matrix based on an 8×8 quantization matrix,
wherein the 32×32 quantization matrix is generated by duplicating one of a first element and a second element adjacent to each other in the 8×8 quantization matrix as an element between the first element and the second element in the 32×32 quantization matrix.

9. The method according to claim 8, further comprising transforming, by the circuitry, the image data to generate the transform coefficient data on the basis of the 32×32 transform unit.

10. The method according to claim 9, further comprising encoding the quantized transform coefficient data to generate an encoded stream.

11. The method according to claim 10, further comprising capturing an image and generating the image data from the image.

12. The method according to claim 11, further comprising storing the encoded stream.

13. The method according to claim 11, further comprising multiplexing the encoded stream with an audio stream to generate a multiplex stream.

14. The method according to claim 13, further comprising:
generating a transmission signal by encoding and modulating the multiplex stream; and
transmitting the transmission signal.

* * * * *